United States Patent [19]

Nubson et al.

[11] Patent Number: 5,037,216

[45] Date of Patent: Aug. 6, 1991

[54] SYSTEM AND METHOD FOR PRODUCING DATA BEARING CARDS

[75] Inventors: Richard C. Nubson, Eden Prairie; Glenn R. Carney, Eagan; Luc DeBleeckere, Crystal; Ronald B. Howes; Milo B. Squires, both of Minneapolis; David E. Wickstrom, St. Louis Park; Dennis J. Warwick, Richfield; Benjamin H. Sannel, St. Louis Park; Gretchen J. Moeller, Plymouth, all of Minn.; Paul R. Caron, Tiverton; Harold D. Schofield, Naragansett, both of R.I.

[73] Assignee: DataCard Corporation, Minneapolis, Minn.

[21] Appl. No.: 249,338

[22] Filed: Sep. 23, 1988

[51] Int. Cl.⁵ .................... B41J 2/325; B41J 2/335
[52] U.S. Cl. .................... 400/120; 400/208; 400/175; 400/701; 400/241.1; 346/76 PH; 15/100; 15/102
[58] Field of Search .......... 400/54, 120, 130, 131, 400/208, 225, 175, 234, 249, 692, 701, 702, 702.1, 241.1, 241.2; 101/162, 416.1, 417, 418, 423, 425; 219/216 PH; 346/76 PH; 15/100, 102, 256.5, 256.51, 256.52; 198/494, 496; 355/296, 298

[56] References Cited

U.S. PATENT DOCUMENTS

| | | | |
|---|---|---|---|
| 3,800,349 | 4/1974 | Green | 15/102 |
| 4,006,507 | 2/1977 | Yoshida | 15/102 |
| 4,009,047 | 2/1977 | Lindsay | 15/256.52 |
| 4,082,037 | 4/1978 | Grindley et al. | 101/425 |
| 4,289,666 | 9/1981 | Creekmore et al. | 400/696 |
| 4,321,286 | 3/1982 | Scott et al. | 400/241.2 |
| 4,329,075 | 5/1982 | Applegate et al. | 400/120 |
| 4,343,837 | 8/1982 | DeLorenzo | 400/120 |
| 4,467,335 | 8/1984 | Schmidt et al. | 346/160 |
| 4,519,600 | 5/1985 | Warwick et al. | 354/3 |
| 4,536,774 | 8/1985 | Inui et al. | 346/76 PH |
| 4,551,813 | 11/1985 | Sanbayashi et al. | 271/258 |
| 4,573,058 | 2/1986 | Brooks | 346/76 PH |
| 4,577,198 | 3/1986 | Hibino et al. | 400/120 |
| 4,590,484 | 5/1986 | Matsushita | 346/76 PH |
| 4,595,935 | 6/1986 | Brooks et al. | 346/76 PH |

(List continued on next page.)

FOREIGN PATENT DOCUMENTS 189770  8/1986  European Pat. Off. ........ 400/701

(List continued on next page.)

OTHER PUBLICATIONS

IBM Technical Disclosure Bulletin—6/87, pp. 358-359, vol. 30, No. 1.
IBM Technical Disclosure Bulletin—8/85, p. 1369, vol. 28, No. 3.
IBM Technical Disclosure Bulletin—8/83, pp. 1586-1587, vol. 26.
IBM Technical Disclosure Bulletin—5/79, pp. 4959-4960, vol. 21.

*Primary Examiner*—David A. Wiecking
*Attorney, Agent, or Firm*—Merchant, Gould, Smith, Edell, Welter & Schmidt

[57] ABSTRACT

An apparatus and method for printing a graphic design on a hard plastic workpiece such as a credit card blank includes a thermal printing element which is supported by a head assembly that has been designed a single link, to have low mechanical compliance in a horizontal plane and yet to allow the print head to align with a print roller. A cleaning assembly is further provided which includes a pair of cleaning rollers having an adhesive coating; and a novel arrangement for stripping particulate matter away from the cleaning rollers after a predetermined number of cards have been cleaned. A number of stepper motors are provided to perform the cleaning and printing functions. The stepper motors are controlled by a local control system which monitors a number of sensors provided on the cleaning and printing stations and is subservient to an overall system controller. The invention further includes a novel method of operation, a cassette for use with the printing station and a novel thermal printing foil.

83 Claims, 22 Drawing Sheets

U.S. PATENT DOCUMENTS

| | | | |
|---|---|---|---|
| 4,629,306 | 12/1986 | Warwick | 400/134 |
| 4,639,744 | 1/1987 | Uchikata et al. | 400/356 |
| 4,650,350 | 3/1987 | Dorner | 400/120 |
| 4,651,164 | 3/1987 | Abe et al. | 346/76 PH |
| 4,651,166 | 3/1987 | Katsuragi | 400/120 |
| 4,675,746 | 6/1987 | Tetrick et al. | 358/296 |
| 4,695,850 | 9/1987 | Nubson | 400/120 |
| 4,723,132 | 2/1988 | Matsuo | 400/120 |
| 4,747,716 | 5/1988 | van der Eikel | 400/249 |
| 4,755,069 | 7/1988 | LaManna et al. | 400/130 |
| 4,764,041 | 8/1988 | Bierhoff | 400/208 |
| 4,776,714 | 10/1988 | Sugiura et al. | 400/208 |
| 4,781,115 | 11/1988 | Ueda et al. | 101/425 |
| 4,818,126 | 4/1989 | Brooks et al. | 400/120 |
| 4,855,756 | 8/1989 | Gluck et al. | 400/120 |
| 4,896,977 | 1/1990 | Takagi et al. | 400/120 |

FOREIGN PATENT DOCUMENTS

| | | | |
|---|---|---|---|
| 60268 | 5/1981 | Japan | 400/120 |
| 99679 | 8/1981 | Japan | 400/120 |
| 144172 | 11/1981 | Japan | 400/120 |
| 150588 | 9/1982 | Japan | 400/120 |
| 7387 | 1/1983 | Japan | 400/701 |
| 14792 | 1/1983 | Japan | 400/120 |
| 42471 | 3/1983 | Japan | 400/120 |
| 53456 | 3/1983 | Japan | 400/120 |
| 191175 | 11/1983 | Japan | 400/120 |
| 26774 | 2/1984 | Japan | 355/298 |
| 36276 | 2/1984 | Japan | 355/298 |
| 222374 | 12/1984 | Japan | 400/120 |
| 2391 | 1/1985 | Japan | 400/120 |
| 19550 | 1/1985 | Japan | 400/120 |
| 42077 | 3/1985 | Japan | 400/120 |
| 46268 | 3/1985 | Japan | 400/120 |
| 87071 | 5/1985 | Japan | 346/76 PH |
| 99669 | 6/1985 | Japan | 400/120 |
| 165281 | 8/1985 | Japan | 400/249 |
| 192689 | 10/1985 | Japan | 400/241.1 |
| 66673 | 4/1986 | Japan | 400/120 |
| 61-79041 | 4/1986 | Japan . | |
| 181656 | 8/1986 | Japan | 400/120 |
| 219681 | 9/1986 | Japan | 400/120 |
| 274971 | 12/1986 | Japan | 400/208 |
| 274974 | 12/1986 | Japan | 400/120 |
| 83166 | 4/1987 | Japan | 400/120 |
| 202780 | 9/1987 | Japan | 400/225 |
| 208957 | 9/1987 | Japan | 400/120 |
| 35363 | 2/1988 | Japan | 400/701 |
| 56478 | 3/1988 | Japan | 400/701 |
| 8801941 | 3/1988 | PCT Int'l Appl. | 400/120 |
| 2080736 | 2/1982 | United Kingdom | 400/320 |

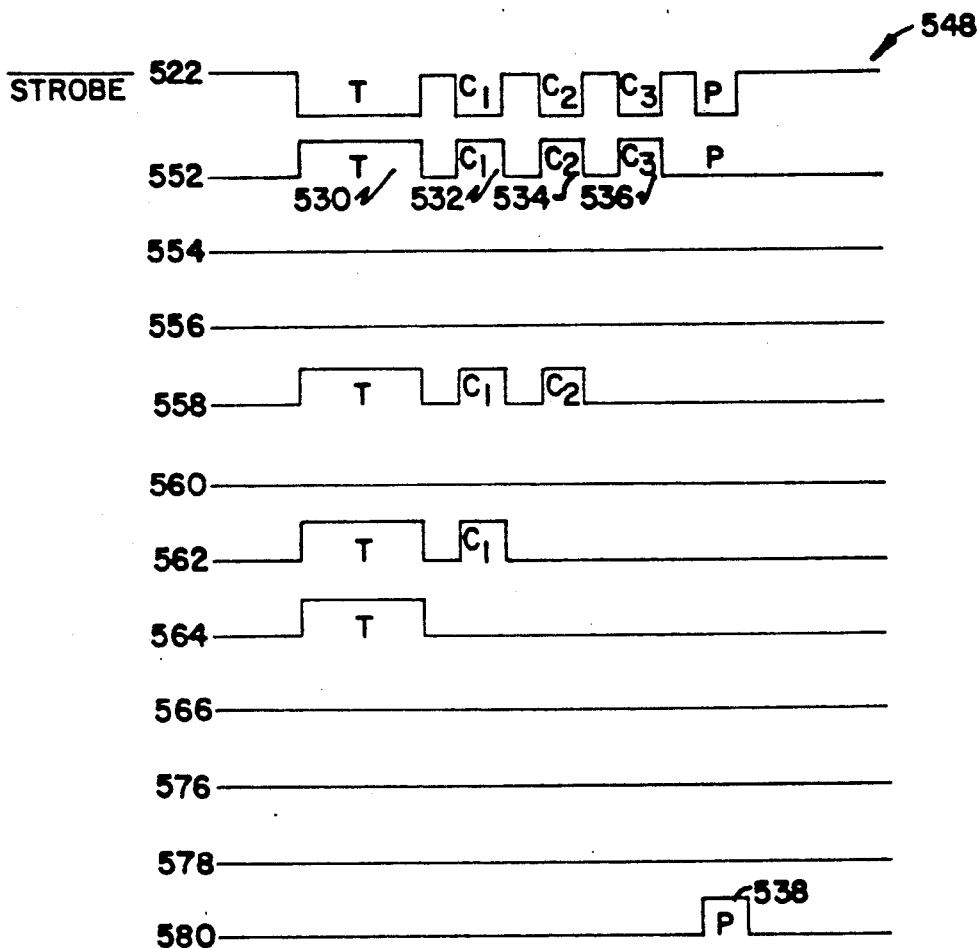

SYSTEM AND METHOD FOR PRODUCING DATA BEARING CARDS

BACKGROUND OF THE INVENTION

1. Field of the Invention

The present invention relates to a system and method for producing plastic data bearing cards such as credit cards. More particularly, the present invention relates to a system and method for producing information bearing cards having a graphic design printed thereon which may be varied according to input from a system controller.

2. Description of the Prior Art

A great demand exists in contemporary society for information bearing plastic cards such as credit cards or magnetically encoded cards for use with automatic teller machines (ATMs). Many such cards come with a standardized design thereon which is modified by individual banking institutions, who often seek to place their logos or other identification thereon. These are but only a few of the many examples of the need for being able to transfer images to such items.

Various systems and methods have heretofore existed for transferring images to relatively thick, flexible, non-porous materials such as plastic cards. One example is the use of offset lithography, which is most commonly used in forming the initial design of the cards. Yet another method is the use of hot stamping in conjunction with embossing foils. In addition to other problems, these methods are not sufficiently flexible, because it is very time consuming and expensive to re-tool these systems so as to be able to transfer a different or modified image to the surface of an item.

While thermal printers have been used to create graphics images on paper and the like, they have not been very efficient in transferring images to relatively thick, flexible and non-porous items such as plastic cards. See for example for U.S. Pat. No. 4,695,850 which is commonly assigned with the present application, and U.S. Pat. No. 4,650,350 to Dorner. Commonly assigned pending applications, Ser. Nos. 235,830 and 937,602 filed Aug. 18, 1988 and Dec. 3, 1986, respectively, disclose thermal printers for printing on plastic items. Ser. No. 235,830 is a continuation of Ser. No. 905,288, which was filed Sept. 8, 1986.

Numerous problems encountered by these various thermal printers when printing on plastic cards include the lack of uniformity in the transfer of ink to the surface of the plastic card, which results in a non-uniform image. The images so derived are often not satisfactory for graphics purposes. The present invention solves these problems and other problems associated with existing systems.

SUMMARY OF THE INVENTION

It is an object of the present invention to provide an apparatus which is capable of printing a graphic design on a hard plastic workpiece such as a credit card blank.

It is further an object of the present invention to provide an improved cartridge assembly for use with a thermal printer head which is effective at guiding a thermal printing foil along a planar printing path and storing used foil after printing.

It is further an object of the present invention to provide an apparatus for removing particulate matter from hard plastic workpieces such as credit card blanks prior to printing a graphic design thereon. It is a secondary object of the present invention to provide a device for stripping such particulate matter off of the cleaning apparatus when it becomes overloaded.

A yet further object of the present invention is to provide an improved thermal printing foil for use in a thermal printing system.

In order to achieve the above objects, the present invention provides a system for producing magnetically encoded plastic cards having a graphic design thereon, comprising structure for supplying a series of blank plastic cards; structure for encoding magnetic strip on the cards; structure for separating loose particles from the cards; structure for placing a graphic design on the cards; structure for embossing a number of alphanumeric characters on the cards; and structure for collecting the cards after the cards have passed through the installing structure, the separating structure, the design placing structure and the embossing structure.

According to the invention, the structure for placing a graphic design on the cards comprises structure for feeding the cards along the work feed path; structure positionable adjacent the work feed path for printing a pattern on the cards; structure for precisely aligning the printing structure with respect to the feeding structure so that the printing structure is adapted to bear against the cards at a constant pressure; and structure for controlling the feeding structure and the printing structure to print a predetermined design on the cards.

According to the invention, the structure for separating particulate matter from the cards comprises cleaning structure having at least one engaging surface adapted for engaging the surface of the cards to be cleaned; structure on the engaging surface for attracting loose particles from the corresponding surface of the cards to be cleaned; structure adapted for feeding a workpiece to the cleaning structure; and structure for removing collected particles from the cleaning structure. According to the invention, a cartridge assembly is further provided for use with a thermal printer or the like, comprising an outer casing having an inside and an outside surface; a length of thermal printing foil disposed substantially within the casing; first spool structure for storing an unused portion of the printing foil; second spool structure for storing a used portion of the printing foil; structure for rotatably supporting the first and second spool structure within the outer casing; and structure for guiding the printing foil from the first spool structure to a guide path line within a printing plane and for guiding the foil from the printing plane path to the second spool structure.

According to the present invention, a method of printing a graphic design on a hard plastic workpiece comprises feeding the workpiece along a work feed path to a position adjacent a resistance type thermal printer; precisely aligning a printing surface of the thermal printer with the surface of the workpiece which is to be printed upon; controlling the printer to print on the desired workpiece surface while continuing to feed the workpiece past the printer; and moving the workpiece away from the printer.

The invention also provides a method for removing particulate matter from at least one surface of a workpiece at a cleaning station, comprising detecting the presence of a workpiece before the workpiece reaches the cleaning station; feeding the workpiece into the cleaning station; engaging the surfaces of the workpiece to be cleaned with a corresponding number of particle attracting elements; removing the workpiece from the cleaning station; determining the total number of workpieces that had been cleaned responsive to the detecting step; and removing particles that have collected on the particle attracting elements whenever the total number of workpieces cleaned exceeds a predetermined number.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 26 is a representative depiction of the logic used by the print processor of the invention.

DETAILED DESCRIPTION OF THE PREFERRED EMBODIMENT(S)

Figure 1:
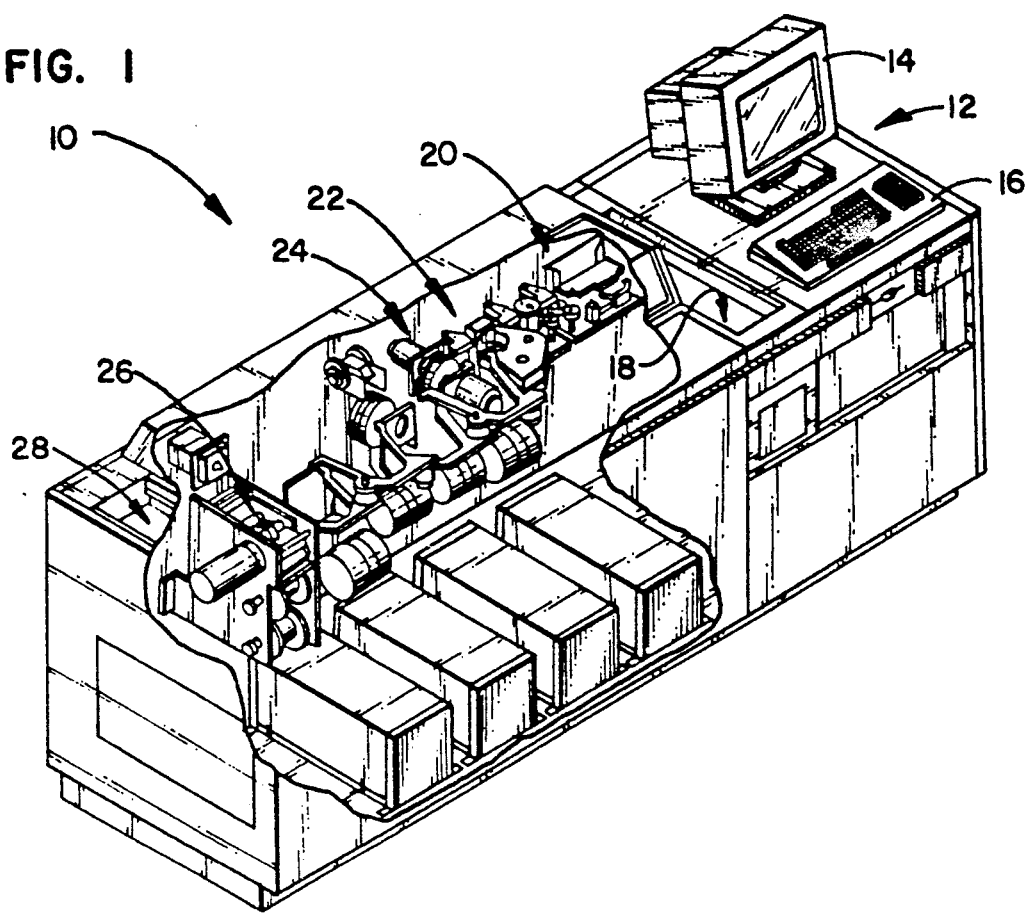
FIG. 1 is a perspective view of a system constructed according to the instant invention, with portions cut away for clarity.

Referring to FIG. 1, a system 10 for producing magnetically encoded embossed plastic cards having a graphic design printed thereon is illustrated. System 10 includes a graphic input terminal 12 having a CRT 14 and a keyboard 16. System 10 further has a card hopper input 18 for holding blank plastic cards prior to processing, a magnetic stripping station 20 for encoding a magnetic strip on a plastic card and a novel graphics station 22 which includes a thermal mass transfer type printer for printing a graphic design on at least one face of the card. In addition, system 10 includes embossing stations 24 for embossing alphanumeric characters into a desired portion of the plastic card or cards. A foil topper station 26 is further provided for coating portions of the card or cards which were raised in embossing stations 24. The system 10 is further provided with an output stacker 28 for storing cards that had been processed at the previously mentioned stations. In the illustrated embodiment, hopper input 18 feeds a blank card to magnetic encoding station 20; the card is then forwarded to the graphic station 22. After processing at graphic station 22, the card is forwarded to the embossing stations 24 which, in turn, pass the card to the foil topper 26. After processing by foil topper 26, the card is passed to output stacker 28 where it may then be removed from the system 10.

Figure 2:
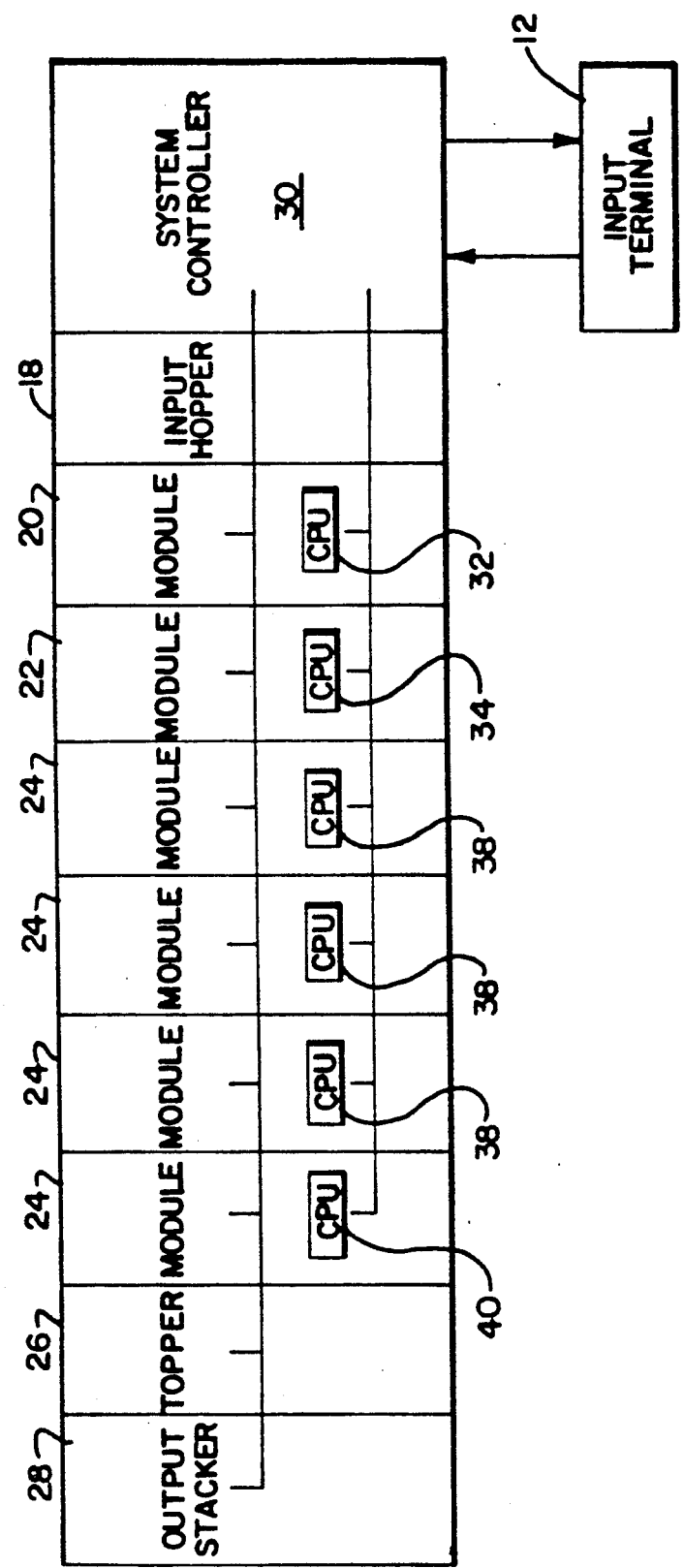
FIG. 2 is a block schematic diagram depicting the control system for the system illustrated in FIG. 1.

Referring now to FIG. 2, the broad system 29 which is used for controlling card producing system 10 is depicted. System 29 includes a system controller 30 which is in communication with alphanumeric input terminal 12, as is shown in FIG. 2. System controller 30 is further in communication with a CPU or card 32 for magnetic stripping station 20, and briefly referring to FIG. 22, with a graphics control CPU or card 34 for graphic station 22. Graphics CPU 34, is preferably in communication with a print engine 502, as will be described further below. Separate CPU s or cards 38 are preferably also provided for embossing station 24, which also is in communication with system controller 30. A further CPU or card 40 may further provide for additional steps or modules as may be required.

As is illustrated in FIG. 2, control system 29 is in communication with input hopper 18, foil topper 26 and output stacker 28. In operation, system controller 30 controls the passage of a card through the various abovedescribed stations in a manner that will be hereinafter described.

Referring to FIGS. 3-6, the structure and operation of graphic station 22 will now be described. Graphic station 22 includes a main frame member 42 which is securable to the chassis of card producing system 10. Mounted to frame member 42 are a number of stepper motors $M_1$, $M_2$, $M_3$, and $M_4$. Referring briefly to FIG.

5, motor $M_1$ is securable to frame member 42 within a mounting recess 68 by a plurality of mounting screws 44. Motor $M_3$ is mounted within a recess 56 by a plurality of mounting screws 48. In like fashion, mounting screws 49 secure motor $M_4$ to frame 42. Briefly referring to FIG. 4, Stepper Motor $M_2$ is mounted in like fashion to frame 42 by mounting screws 46.

Figure 3:
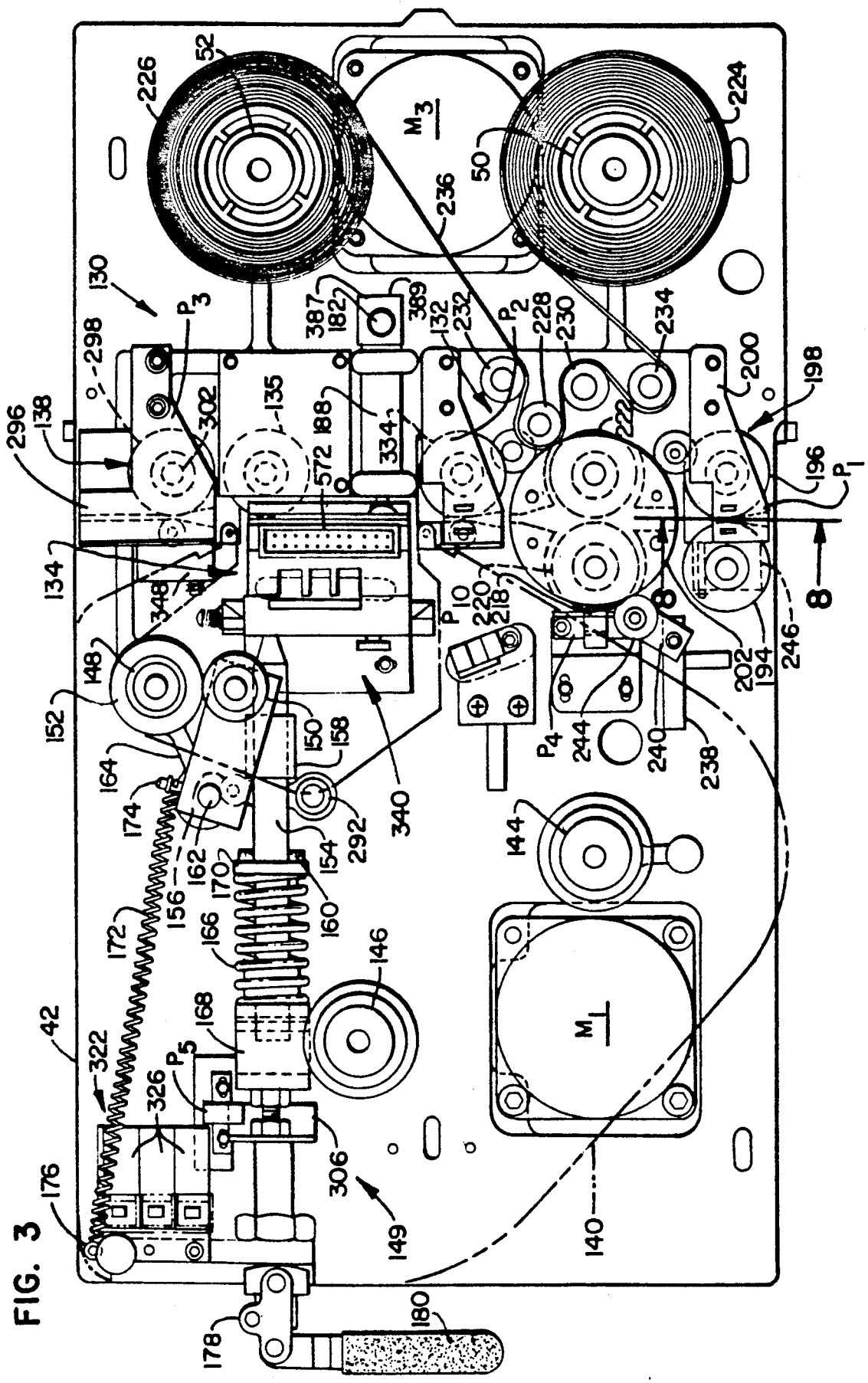
FIG. 3 is a top plan view of the graphic station illustrated in FIG. 1, with a printer foil cartridge illustrated in broken lines.

Referring to FIG. 3, graphic station 22 is formed of a printing unit 130 which is adapted to print a graphic design on a plastic card, and a cleaning unit 132 which is for cleaning loose particles off a plastic card before the card is fed into printing unit 130. In operation, a plastic card is guided along a linear work feed path through cleaning unit 132 and printing unit 130. In order to guide each card along the work feed path, the apparatus is provided with a first top edge guide member 62 for guiding a card into cleaning unit 132, a second top edge guide member 64 for guiding a card from cleaning unit 132 to printing unit 130 and a third top edge guide member 66 for guiding the card out of printing unit 130 and into a subsequent station. In order to facilitate control of the system in a manner that will be described below, first, second and third top edge guide members 62, 64, 66 are each respectively provided with a photosensor P1, P2 and P3 for detecting the presence of a card in a guide slot defined in each of the respective guide members.

Figure 4:
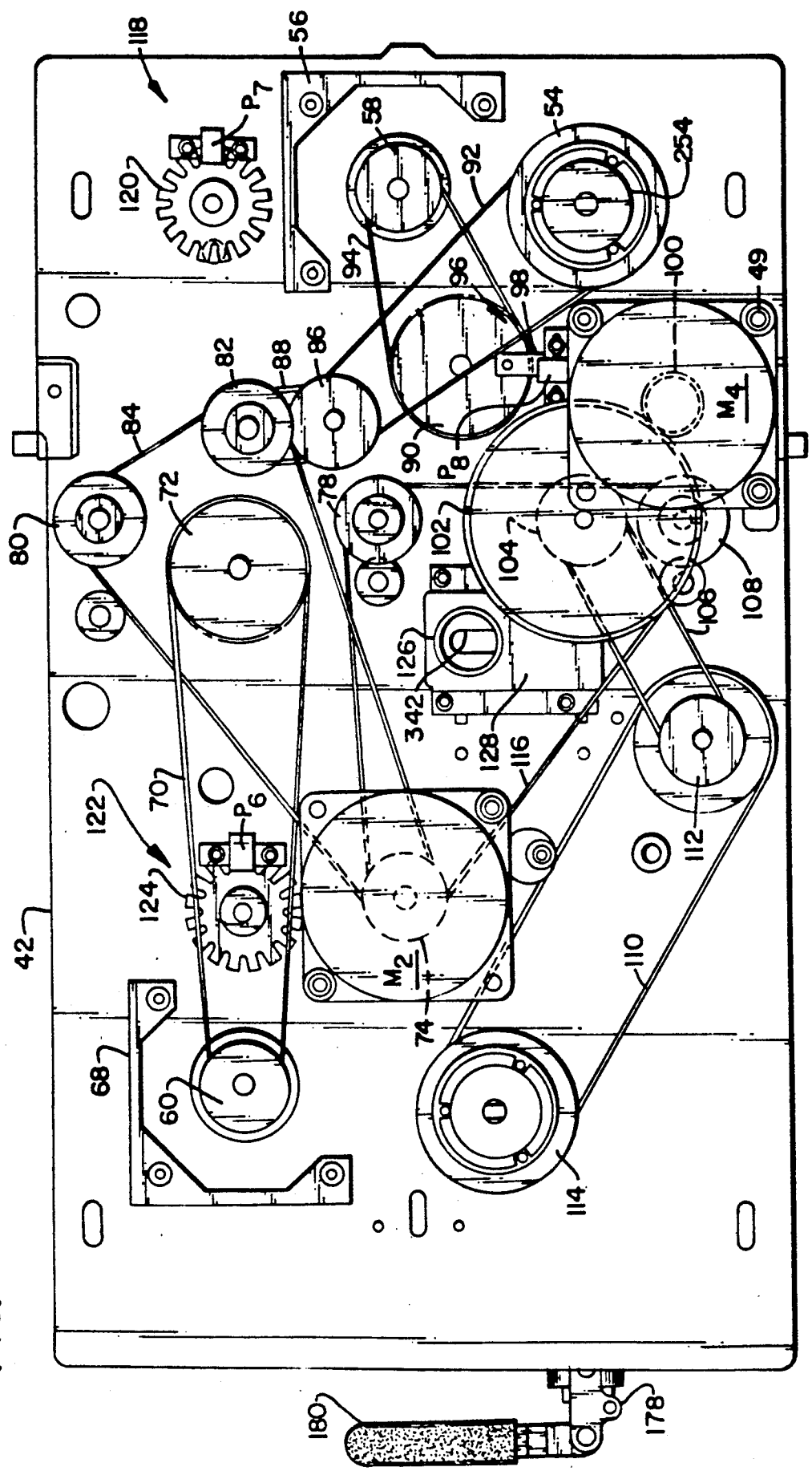
FIG. 4 is a bottom plan view of the assembly illustrated in FIG. 3.

Referring to FIGS. 3 and 4, a first stripper tape spindle 50 and second stripper tape spindle 52 are arranged to extend upwardly in a direction normal to an upper surface of frame 42 and are each connected to shafts which extend through frame 42. Spindle 52 is mounted for rotation on frame 42 by a one-way bearing which allows the spindle 52 to move only counterclockwise as viewed in FIG. 7. In this way, the second stripper tape spindle 52 is arranged to rotate with a pulley 54 which is provided beneath frame 42, as is shown in FIG. 4. In like fashion, first stripper tape spindle 50 is arranged to rotate with a serrated disk 120 which is provided beneath frame 42. Serrated disk 120 is adjacent to a photosensor P7 and forms therewith a stripping tape payout motion sensor 118 which is monitored by the control system, as will be below described.

Printing unit 130 is provided with first and second foil drive spindles 144, 146 which each extend through frame 42. Second foil drive spindle 146 is connected for rotation with a pulley 114, and first printer foil spindle 144 is connected for rotation with a serrated disk 124 which together with photosensor P6 forms a motion sensor 122 that is monitored by the control system, as will be described hereinafter. First and second feed rollers 194, 196 are provided at the entrance to cleaning unit 132 and are connected for synchronous rotation. Second feed roller 196 is connected for rotation with a feed roller input pulley 80 provided beneath frame 42. As is illustrated in FIG. 3, a stripper roller 228, a first stripper guide roller 230, a second stripper guide roller 232 and a third stripper guide roller 234 extend vertically from the top surface of frame 42. First and second stripper guide rollers 230, 232 are connected for rotation, respectively, with a first stripping tape guide roll input pulley 82 and a second stripping tape guide roll input pulley 86 which extend beneath frame 42. Cleaning unit 132 further includes a turret body 202 which is arranged to rotate with a turret input pulley 72 that extends beneath frame 42. Stepper motor $M_1$ is connected to an output pulley 60 that extends beneath frame 42. A first timing belt 70 engages $M_1$ output pulley 60 and the turret input pulley 72 so as to turn the turret body 202 in nonslipping fashion when motor $M_1$ is instructed to turn by the control system. Similarly, stepper motor $M_2$ is provided with an output pulley 74 which is arranged to rotate the feed roller input pulley 80 and a first portion of input pulley 82 by means of a second timing belt 84, as is best shown in FIG. 4. A second pulley portion of first input pulley 82 and a second pulley portion of input pulley 86 are connected for synchronous rotation by a third timing belt 88. Pulley 82 is provided with a one-way clutch between the first and second pulley portions thereof which allows clockwise relative movement of the second pulley portion relative to the first pulley portion as viewed in FIG. 4.

Figure 5:
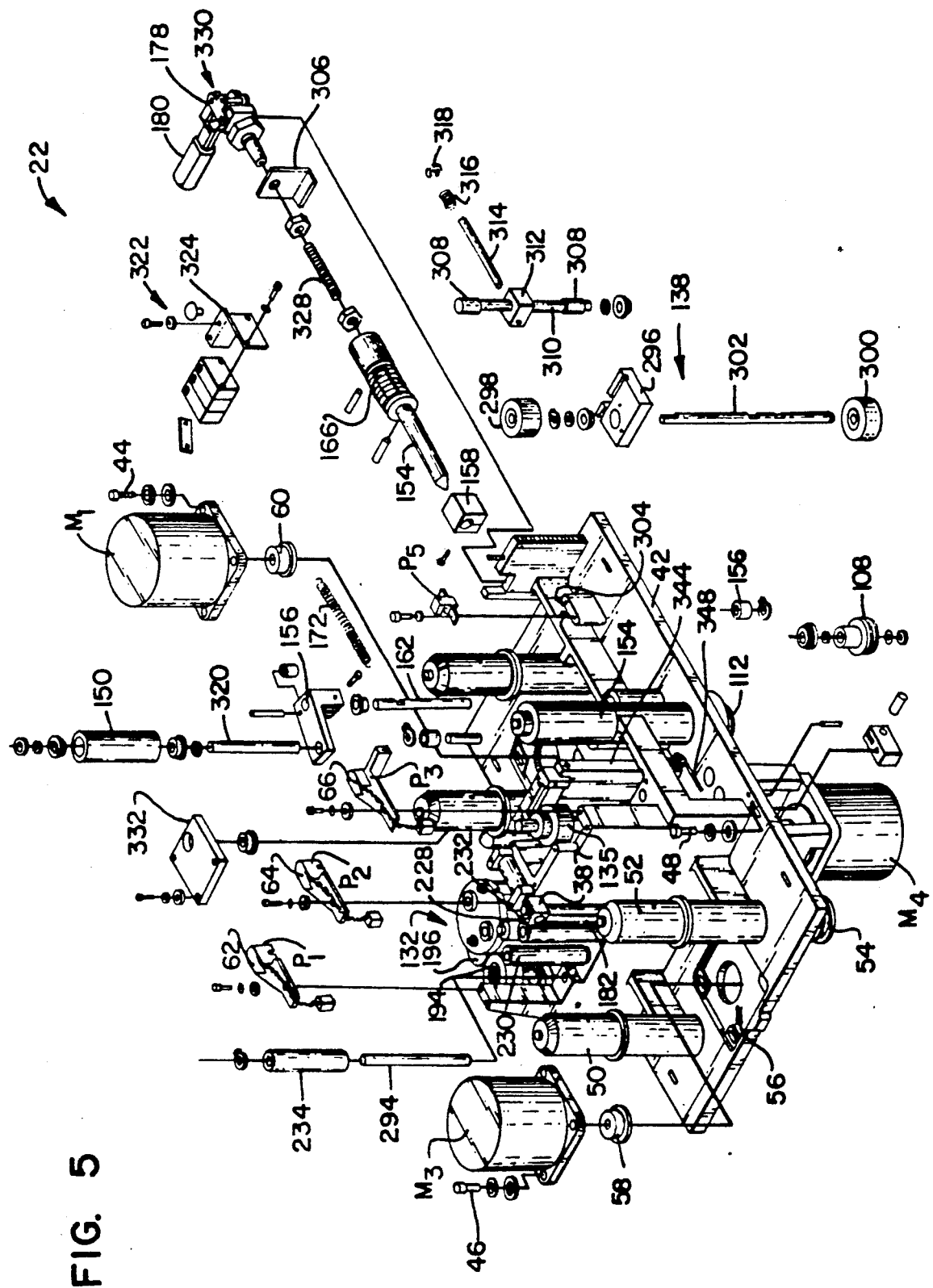
FIG. 5 is an exploded perspective view of the assembly illustrated in FIG. 3.
Figure 6:
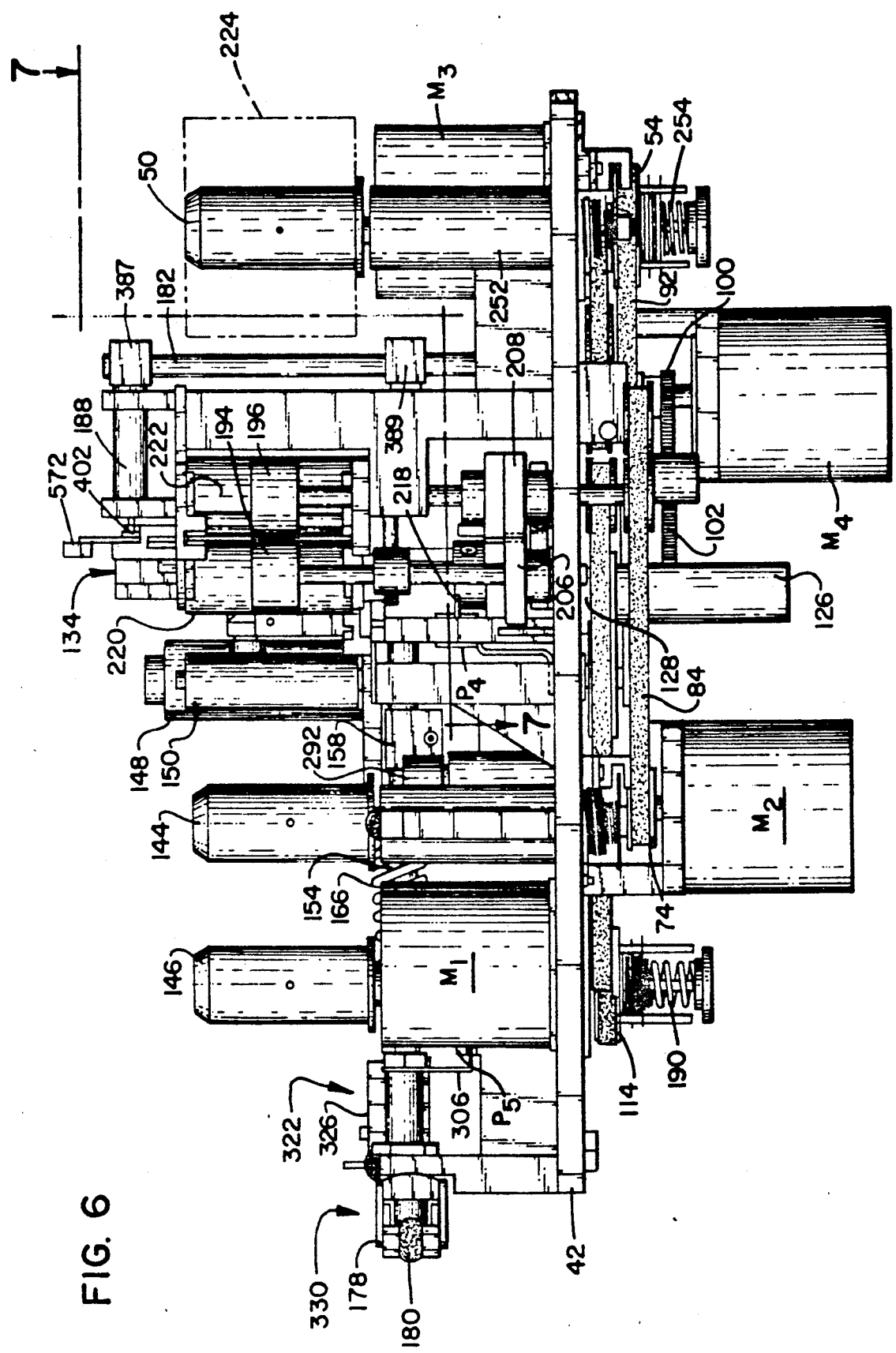
FIG. 6 is a side elevational view of the graphic station assembly illustrated in FIG. 3.

For a purpose that will be described later, printer unit 130 is provided with a cam shaft 182 which is connected for rotation with a cam shaft input pulley 90 arranged beneath frame 42. Cam shaft input pulley 90 is adapted to be rotated by an output pulley 58 which is connected to stepper motor $M_3$ by a fourth timing belt 94, as is shown in FIG. 4. Briefly referring to FIG. 12, printing unit 130 is provided with a first printer feed roll pair 334, 336. Roller 334 is connected for rotation with a first printer feed roll input pulley 78 which extends beneath frame 42, as is shown in FIG. 4. Printing unit 130 further includes a second print feed roller pair 138, which, as illustrated in FIG. 5, includes a first pair of rollers 298, 300 adapted to rotate with a drive shaft 302 and a second pair of smaller diameter rollers 308 adapted to rotate with a support shaft 310. Referring again to FIG. 4, drive shaft 302 for the second print feed roller pair 138 is connected to a pulley 108 which extends beneath frame 42. Output pulley 74 for step motor $M_2$ drives first printer feed roll pulley 78 and second printer feed roll pulley 108 by means of an eighth timing belt 116. In addition, second stripper tape spindle pulley 54 is driven by a first pulley portion of the second stripping tape guide roll input pulley 86 by means of a fifth timing belt 92. In this way, stepper motor $M_2$ performs the dual function of driving all of the feed roll pulleys 80, 78, 102 as well as the first and second stripping tape guide rolls input pulleys 82, 86 and the second stripper tape spindle pulley 54, in a manner that will be described further below.

Referring again to FIG. 4, stepper motor $M_4$ is provided with an output pinion 100 which engages a reduction gear 102. Reduction gear 102 is connected for rotation with an $M_4$ output pulley 104. Referring briefly to FIG. 3, printing unit 130 includes a first capstan roller guide 148 for guiding a printer tape during the printing process. First capstan roller guide 148 is connected for rotation with a capstan roller guide input pulley 112 which, in turn, is connected for rotation with $M_4$ output pulley 104 by a sixth timing belt 106. In addition, capstan roller guide input pulley 112 is constrained to rotate with the pulley 114 for the second foil drive spindle 146 by a seventh timing belt 110. Printing unit 130 is provided with a printer roller 135, for purposes which will be clarified below. Printer roller 135 is constrained for rotation with $M_4$ output pulley 104. In this way, $M_4$ controls the rotation of print roller 135, the first capstan guide roller 148 and the second printer foil drive spindle 146.

Also provided beneath frame 42, as viewed in FIG. 4, is a cam shaft position sensor 96 which includes a photosensor $P_8$ and a cam shaft flag 98 mounted on the cam shaft input pulley 90. The cam shaft position sensor 96 allows the control system to monitor the position of the cam shaft at any given time.

Also mounted beneath frame 42 is an air supply plenum 126 which is connected to a central air supply duct for the overall card producing system 10. Plenum 126 communicates with a box-shaped manifold 128 which, in turn, is in communication with a passage 342 through frame 42 to allow air from the manifold 128 to cool selected areas of the printing unit 130 during operation.

Figure 12:
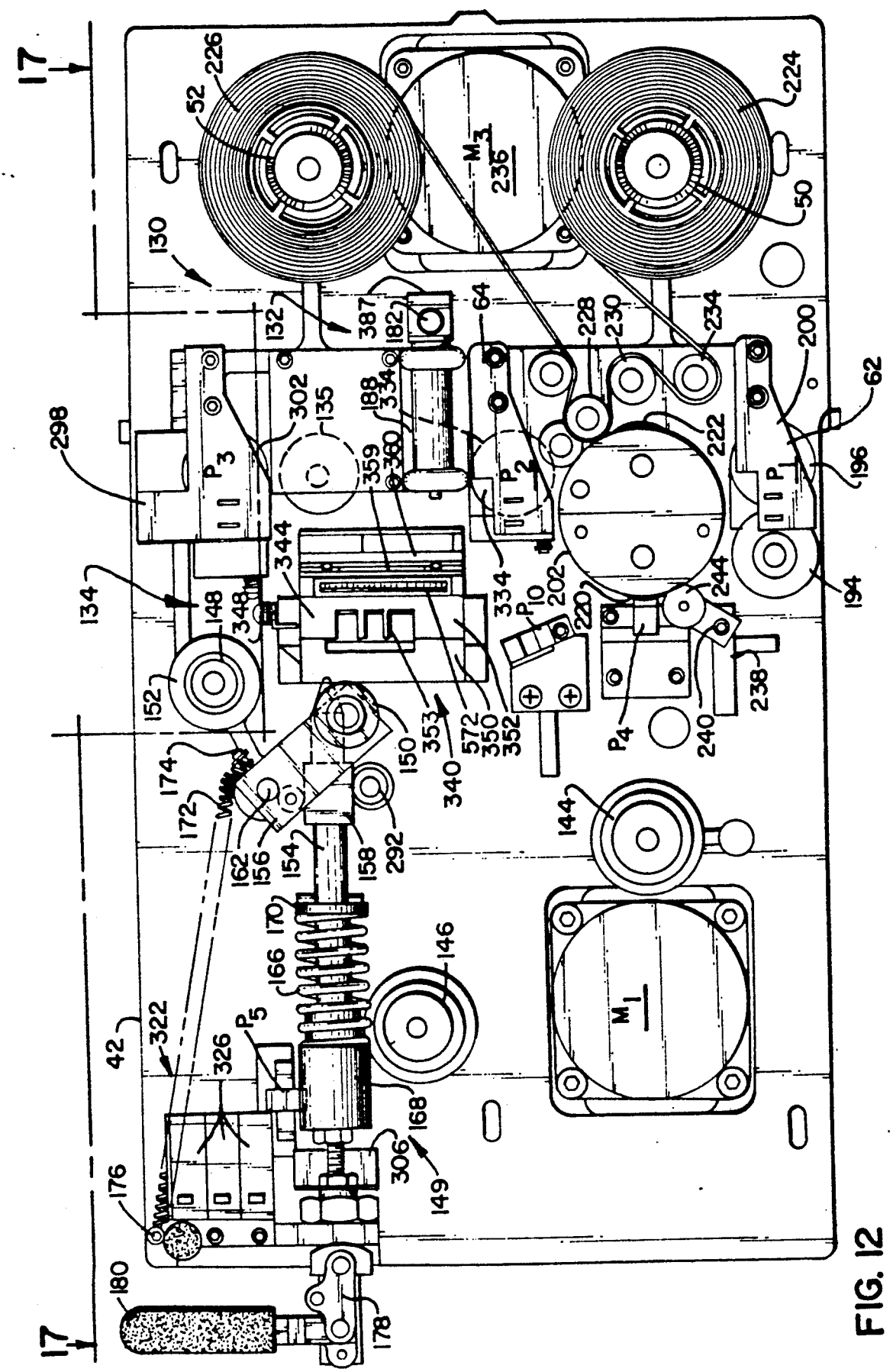
FIG. 12 is a top plan view similar to that illustrated in FIG. 3, with the printer head illustrated in its released condition.

Referring again to FIG. 3, printing unit 130 includes a printing head assembly 134 including a printing head 340, the printer roller 135 and first and second print feed roller pairs 136, 138. A thermal printing foil 142 is provided in a cartridge 140 and guided when the cartridge is position through a printing plane which extends between printing head 340 and print roller 135. In order to secure cartridge 140 in its proper position on printing unit 130, and to properly orientate printing head 340, a positioning mechanism 149 is provided which includes a plunger 154 movable by a toggle linkage 178 and handle 180 from a first open position as is shown in FIG. 12 to a second closed position, as is shown in FIG. 3. In the closed position, plunger 154 is urged against a pivot plate 344 of the printer head assembly 134 to urge printing head 340 and specifically a thermal print line 374 thereon against print roller 135. In the closed position, as illustrated in FIG. 3, plunger 154 is biased against pivot plate 344 by a compression spring 166 which is interposed between a spring seat 168 attached to the toggle actuation mechanism and a spring stop 170 on plunger 154. As shown in exploded FIG. 5, spring seat 168 is attached to the overall toggle-handle linkage 330 by a threaded rod 328; and a flag member 306 is interposed between threaded rod 328 and the toggle-handle linkage 330. A photosensor $P_5$ is mounted on an upwardly extending mounting surface 304, which is part of frame member 42, so as to be positioned to detect movement of flag 306. As a result, the control system can monitor the position of plunger 154 during operation of the printing unit.

Referring again to FIG. 3, the first stationary capstan guide roller 148 is provided with an outer resilient surface 152 and is mounted on a structural support rib 164 provided on frame 42 so as to rotate about an axis stationary relative to frame 42. A second capstan guide roller 150 is provided to rotate about a pin extending through a pivot block 156, as is shown in FIG. 3. Pivot block 156 is mounted to pivot about a pivot shaft 162 which extends upwardly from a pivot support bearing and structural support rib 164. A tension type spring 172 is stretched between a first mounting screw 176 provided on frame 42 and a second mounting screw 174 provided on pivot block 156 so as to urge pivot block 156 in a counterclockwise direction, thereby forcing second capstan guide roller 150 against the outer resilient surface 152 of first capstan guide roller 148. Pivot block 156 is further provided with a cam pin and bushing 160 and a bearing block guide roller 292 which are adapted to bear against a bearing block 158 provided on plunger 154.

Figure 13:
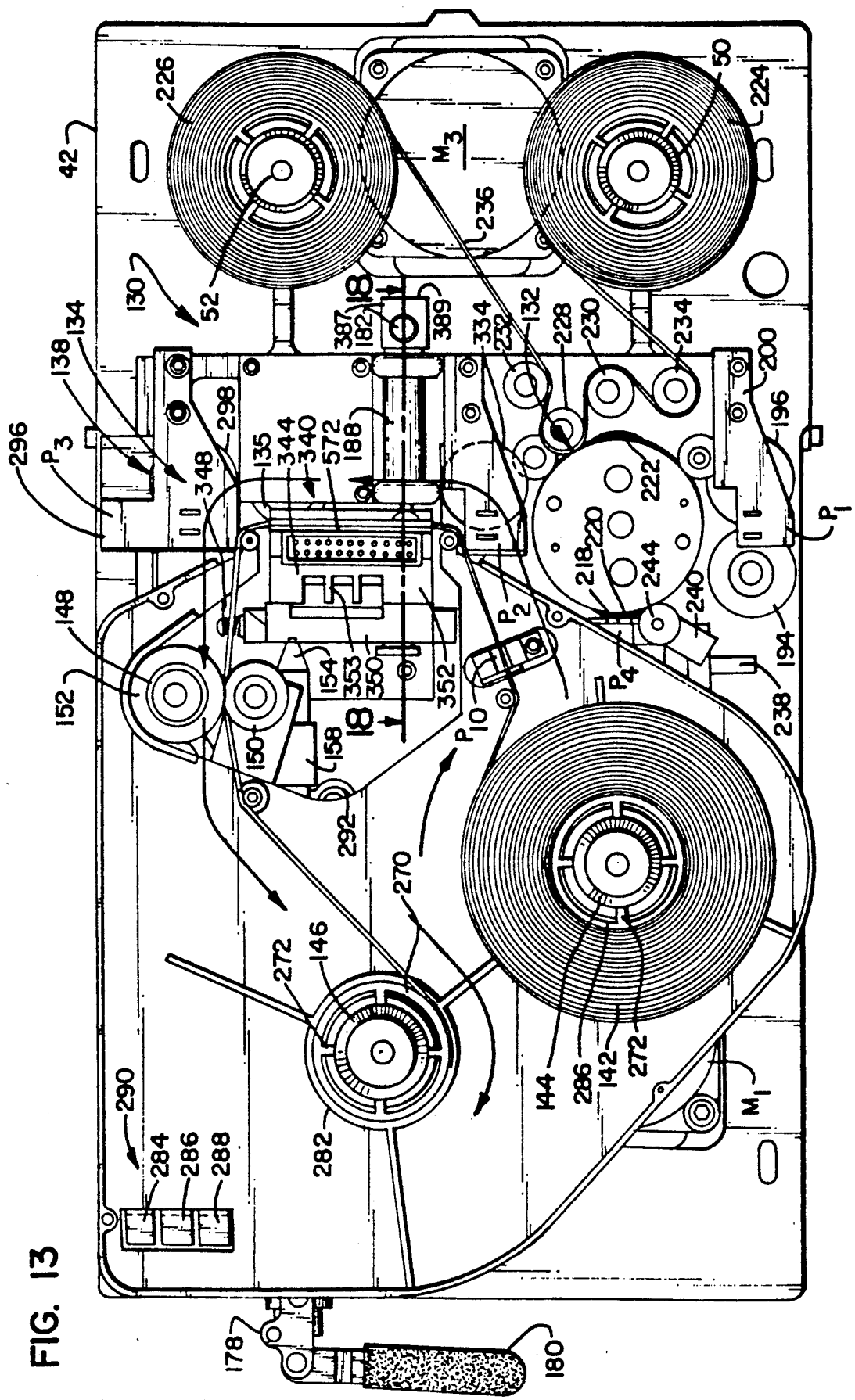
FIG. 13 is a top plan view similar to that illustrated in FIG. 12, with a cartridge illustrated in its operative position, with parts broken away for clarity.
Figure 14:
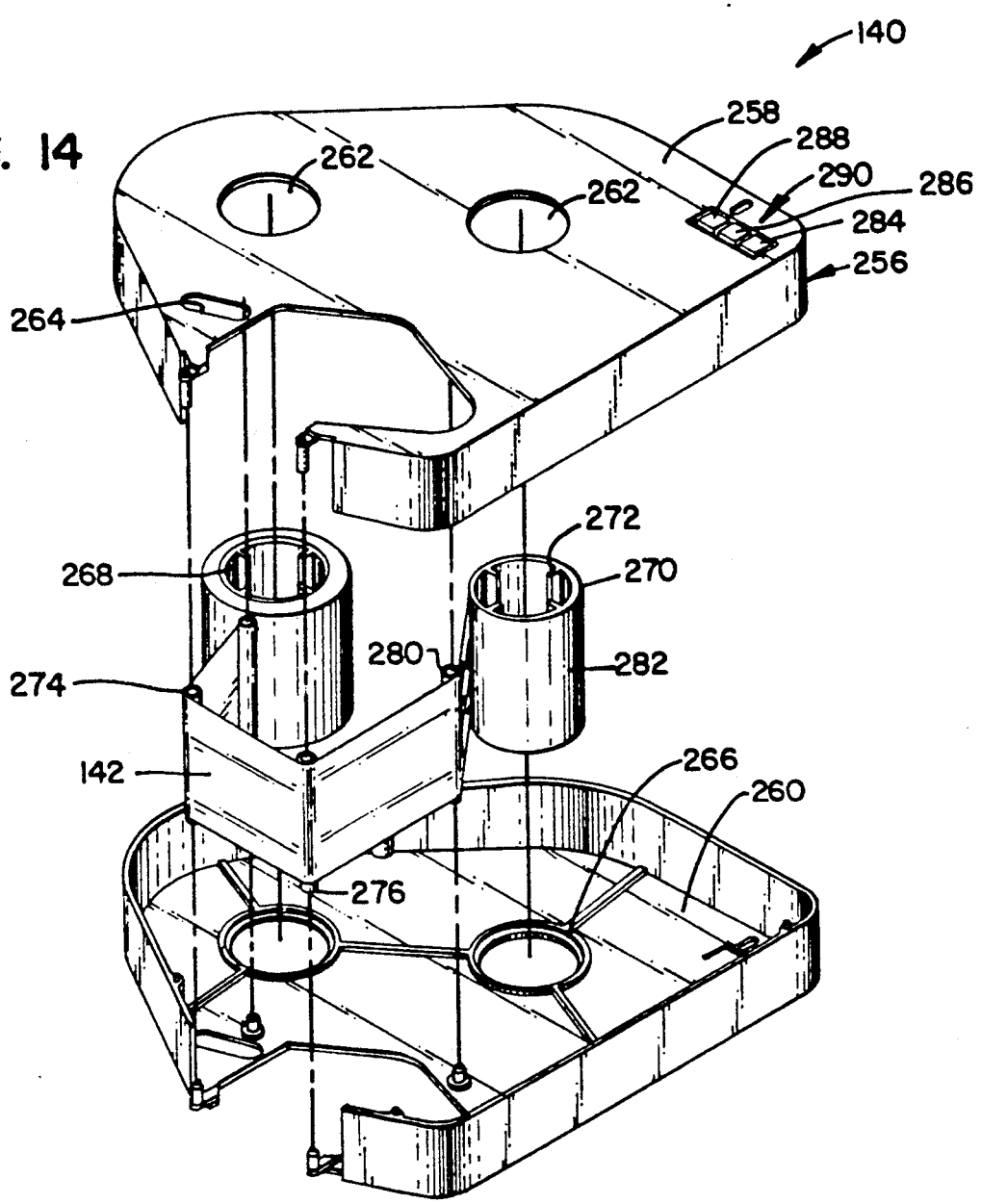
FIG. 14 is an exploded perspective view of a cartridge assembly according to the invention.

When the overall toggle-handle linkage 330 is opened to withdraw plunger 154 to the position illustrated in FIG. 12, cam pin 160 is forced rearwardly by bearing block 158, thus causing pivot block 156 to pivot in a clockwise direction about pivot shaft 162, thereby separating first capstan guide roller 148 from the second capstan guide roller 150. In this position, a cartridge 140 as shown in FIG. 14 may be easily inserted into the printing unit 130 by aligning a pair of circular recesses 262 which are provided in the cartridge 140 with the first and second foil drive spindles 144, 146 so that printing foil 142 stretches between the separated capstan guide rollers 148, 150 as shown in FIG. 13.

At the same time, printing head 340 is allowed to pivot rearwardly toward plunger 154 by a torsion spring 348 which urges pivot plate 344 in that direction, so that the printing foil 142 may be stretched between the printing head 340 and print roller 135. After the cartridge 140 has been so positioned on printing unit 130, toggle-handle linkage 330 may be closed, which causes plunger 154 to urge the printing head 340 toward printer roller 135 and causes the first and second capstan guide rollers 148, 150 to be urged together in a printing foil driving position.

Figure 18:
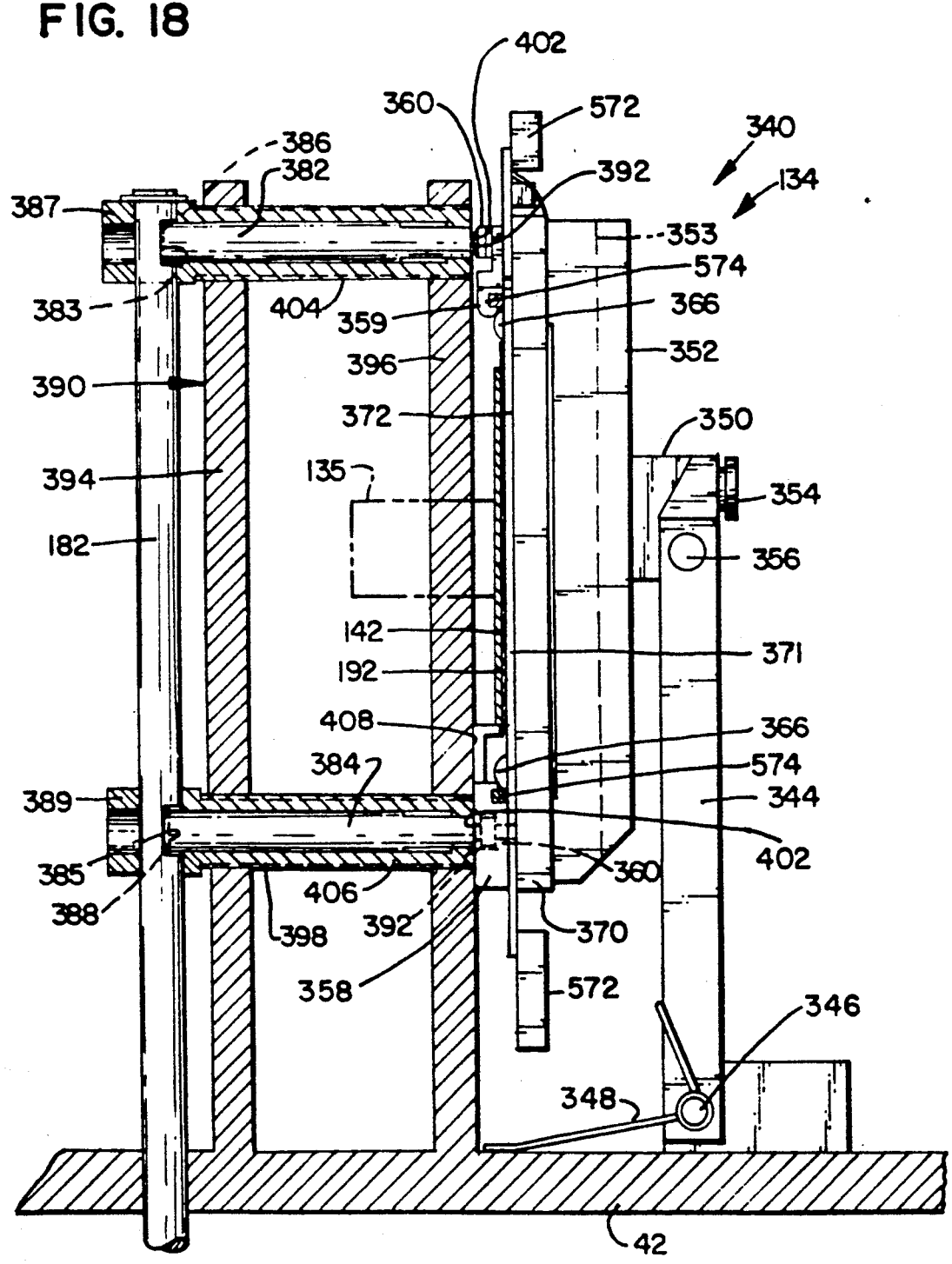
FIG. 18 is a cross-sectional view taken along lines 18-18 of FIG. 13.
Figure 19:
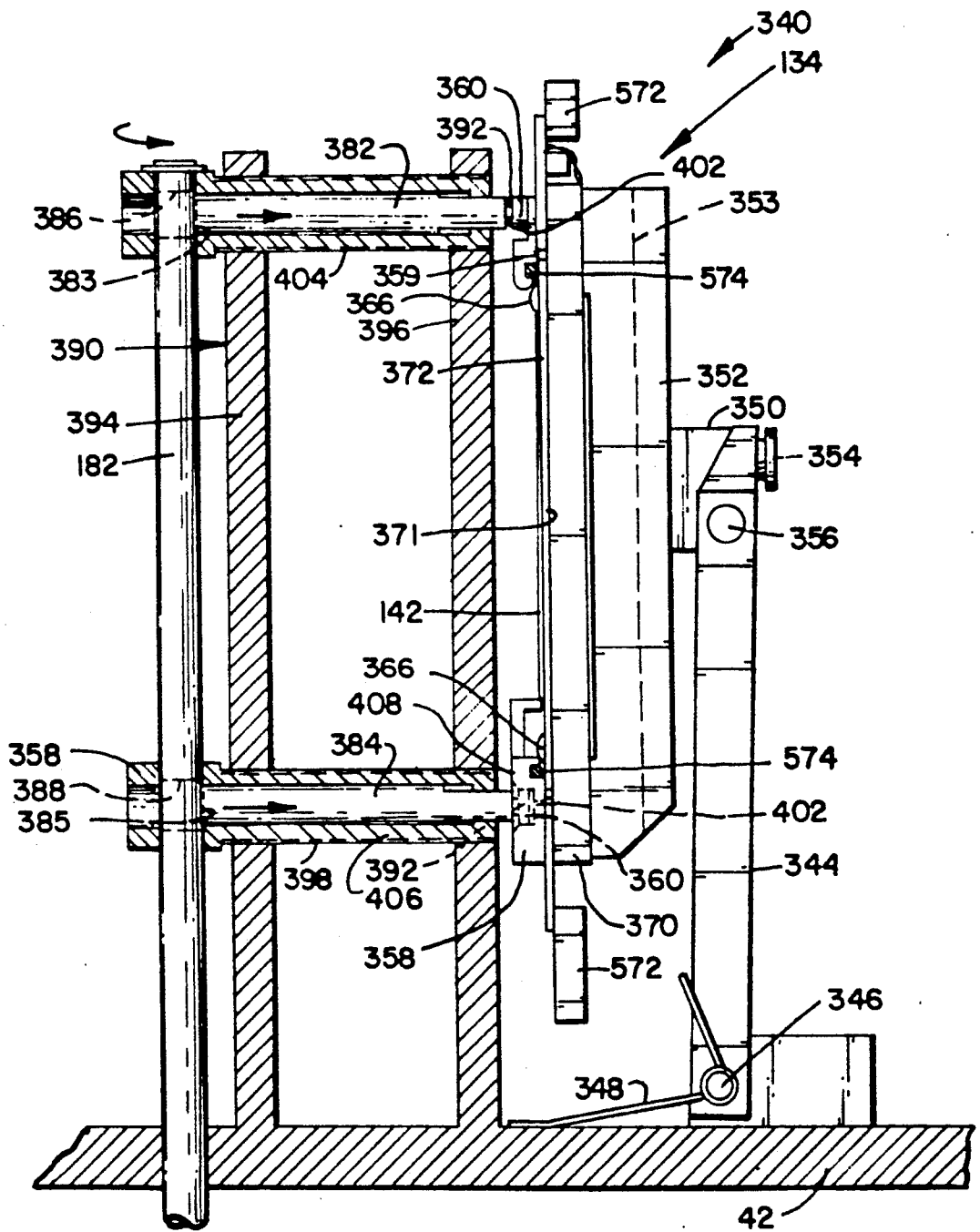
FIG. 19 is a cross-sectional view similar to FIG. 18 with the printer head shown in its released position.

Referring briefly to FIGS. 18 and 19, the invention also includes structure for urging the printer head assembly 134 away from the work feed path of a card 192 against the resilient biasing provided by plunger 155 and compression spring 166 responsive to instructions provided by the control system. As was stated above in reference to FIG. 4, a stepper motor $M_3$ drives a cam shaft 182 through a pair of pulleys 58, 90 and a fourth timing belt 94. As shown in FIG. 18, cam shaft 182 extends upwardly through frame 42 and includes a first cam surface 386 and a second cam surface 388. First cam surface 386 is supported within a first cam housing 387 and second cam surface 388 is supported within a second cam housing 389. A first retractor rod 382 is supported for reciprocation within a first retractor rod housing 188 and a second retractor rod 384 is likewise supported for reciprocation within a second retractor rod housing 398. The first and second retractor rod housings 188, 398 each are provided with a threaded external surface 404, 406, respectively. Frame 42 includes an upstanding support member 390 having a first trunnion like extension 394 and a second trunnion like extension 396. Each of the first and second extensions 394, 396 have a pair of threaded holes defined therein adapted to receive the threaded outer surfaces 404, 406 of first and second retractor rod housings 188, 398. As shown in FIG. 18, the first and second retractor rod housings 188, 398 are adjoined to the first and second cam housings 387, 388, respectively.

Each of the first and second retractor rods 382, 384 are provided with a cam follower surface 383, 385, respectively, for engaging the first and second cam surfaces 386, 388 on cam shaft 182. Each of the retractor rods 382, 384 further have an adjustable contact tip 392 at an opposite end thereof for engaging corresponding contacts 402 which are provided on the printer head assembly 134. In actuality, contacts 402 are surfaces of mounting screws 360, which will be described hereinbelow.

In operation, when the control system instructs stepper motor $M_3$ to turn the cam shaft 182, the first and second retractor rods 382, 384 and their corresponding follower surfaces 383, 385 are cammed by the first and second cam surfaces, 386, 388 on cam shaft 182, thereby forcing retractor rods 382, 384 toward the printer head assembly 134. As a result, adjustable contact tips 392 of the respective retractor rods 382, 384 bear against the contacts 402 on the printer head assembly 134 and thereby urge the printer head assembly rearwardly against the bias of compression spring 166, as is shown in FIG. 19. At the same time, the position of cam shaft 182 may be monitored by the cam shaft position sensor 96 which is illustrated in FIG. 4 and has previously discussed.

Figure 16:
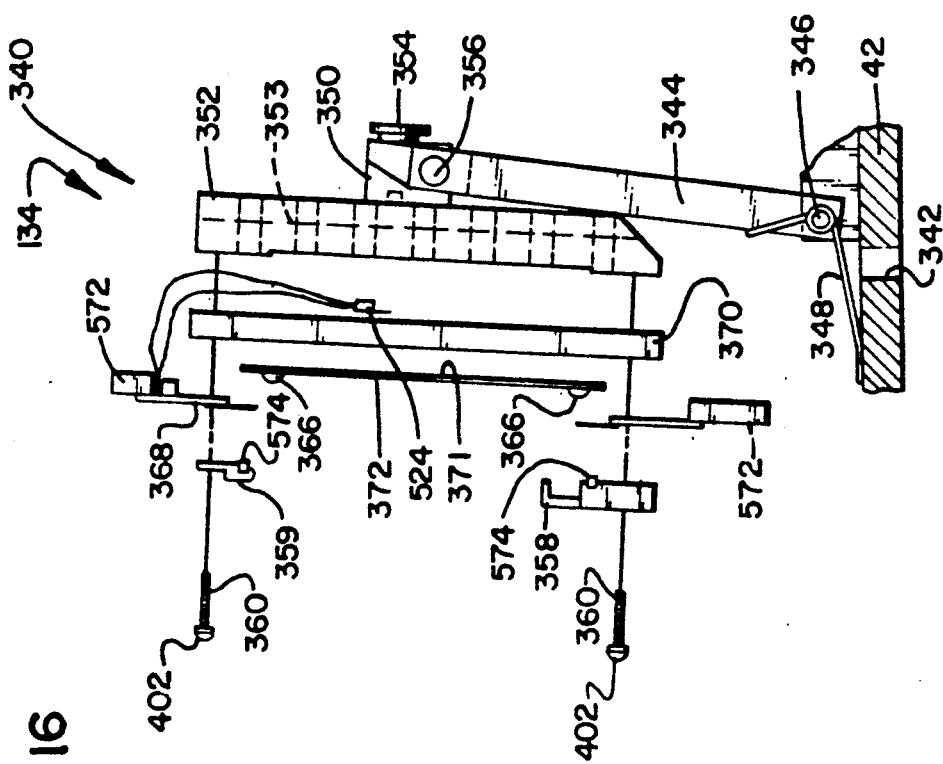
FIG. 16 is an exploded elevational view of the printer head assembly of the invention.
Figure 17:
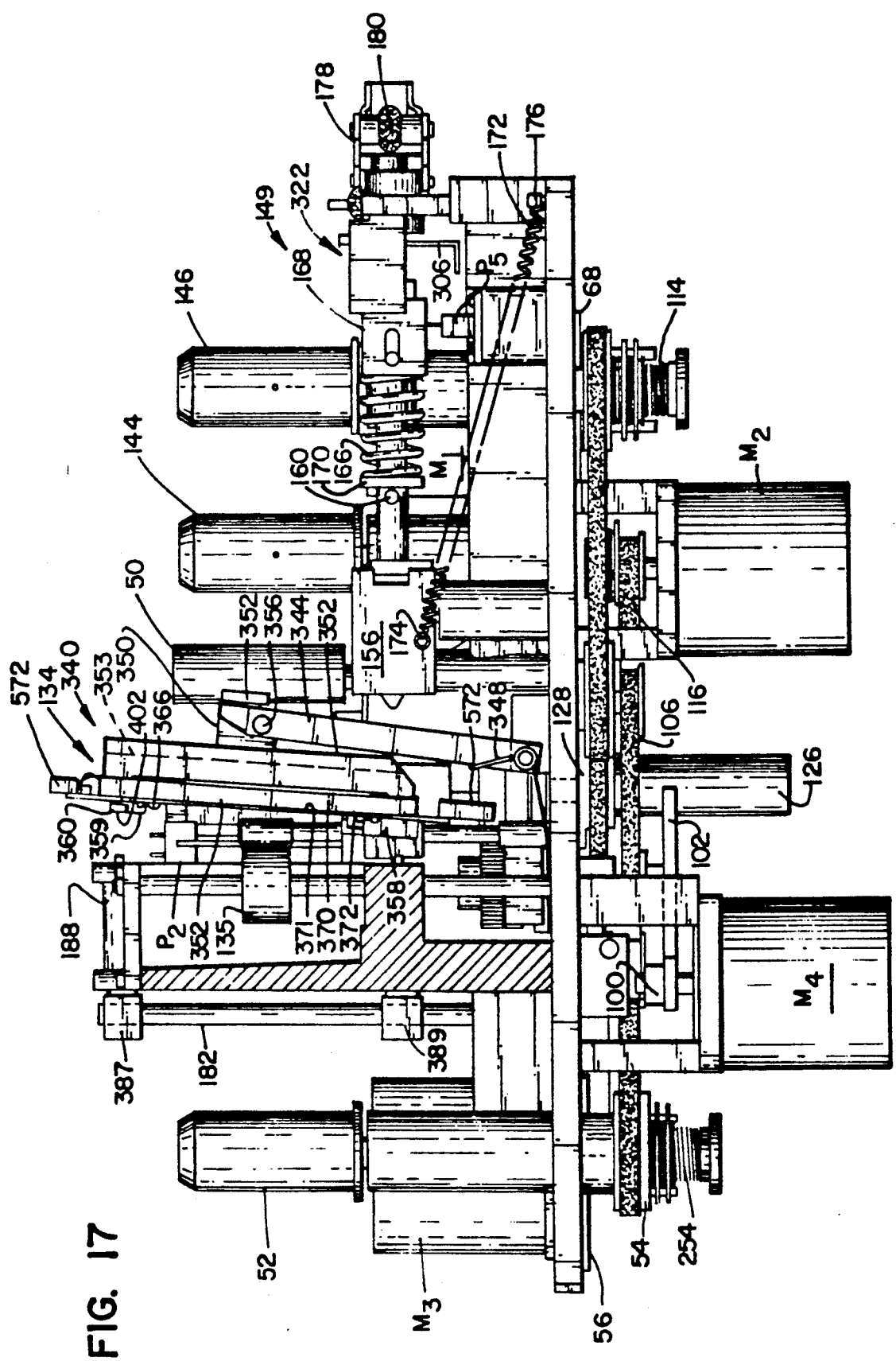
FIG. 17 is a cross-sectional view taken along lines 17—17 in FIG. 12.
Figure 20:
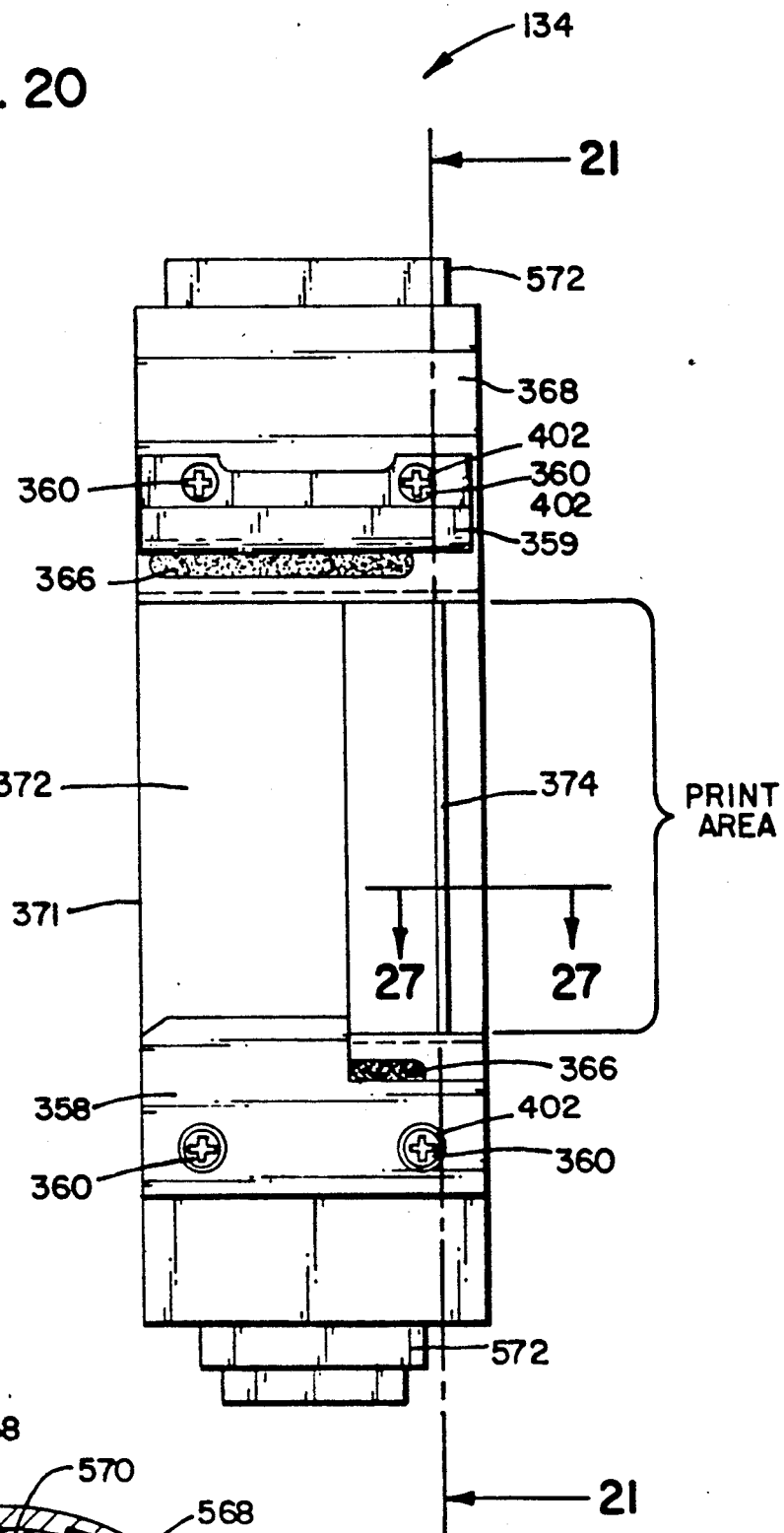
FIG. 20 is an isolated elevational view of a printing surface of the printer head of the invention.
Figure 27:
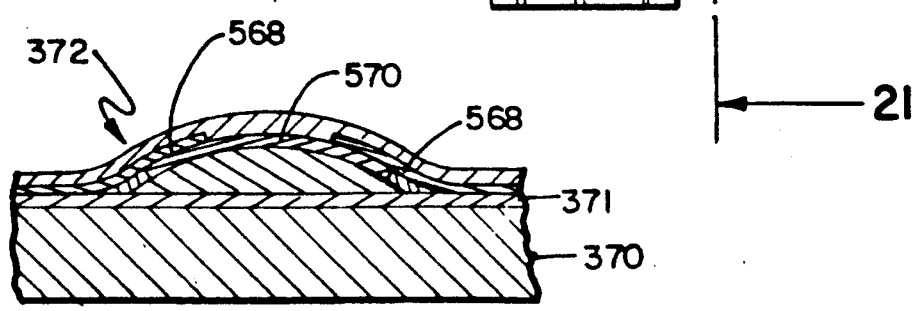
FIG. 27 is a profile of a resistive dot element according to the invention.

Referring now to FIGS. 16, 20, 21 and 27, the structure of printer head assembly 134 will now be discussed. As is best shown in FIG. 16, printing head 340 includes an aluminum heat sink portion 370 which is coated on one side thereof with a ceramic substrate 371. Referring briefly to FIG. 20, the front surface of the printing head 340 includes a thermal print line 374 which has a multiplicity of thermal print resistive elements 376 therein which may be heated according to a predetermined algorithm, which will be discussed hereinafter, in order to induce printing foil 142 to produce the desired graphic pattern upon a workpiece. The ceramic substrate 371 is coated with a partial glaze along the print line 374 to give the thermal print line 374 an elevated shape of 0.001 to 0.003 inches. On top of this glazed portion, a resistive material 570 (0.9 micron thick) is deposited and a number of conductive leads 568 (1.0 micron thick) corresponding to the number of thermal print elements 376 are deposited upon the glazed portion. The area is then coated with a wear layer 372 of silicon carbide or silicon nitride and a print head drive electronics module 366 is bonded directly onto the ceramic substrate 371 with its connections made directly to the conductive leads for the microresistors. As may be seen in FIG. 19, the electronic modules 366 are positioned above and below the workfeed path so as to permit unimpeded passage of the workpiece along a linear path. Upper and lower external electronic connectors 572 are interfaced to the ceramic substrate 371 which includes gold coated leads via flex circuit leads 368 and a compliant silicon rubber block 574 which is clamped by members 359 and 358. A lower card guide 358 and a clamping member 359 are then secured to the printing head 340 by means of a number of mounting screws 360, as is shown in FIG. 16.

Referring again to FIG. 16, a novel mounting structure for the printing head 340 includes a backing block 352 having a plurality of heat dissipating fins 353 thereon which is secured to printing head 340 by a number of mounting screws 410.

In order to ensure even pressure distribution across the printing line 374, the mechanism supporting the print head has been designed to have low mechanical compliance in the horizontal plane and yet allow the print head to align with the print roller 135. Accordingly, the support mechanism in the printer head assembly 134 has been designed as a single link which allows the assembly to be pivoted away from the print roller 135 for foil replacement and also allows the printing head 340 to pivot and follow the minor imperfections of the print roller 135 and minor workpiece thickness variations. This link reacts to horizontal moments and forces which are caused by bearing spacing and tolerance deviations of components in the link. In order to ensure acceptable printing quality, total mechanical deflection of the print head assembly 134 must be less than 10% of the physical size of one printed dot, which is approximately 0.0004 inches.

Figure 21:
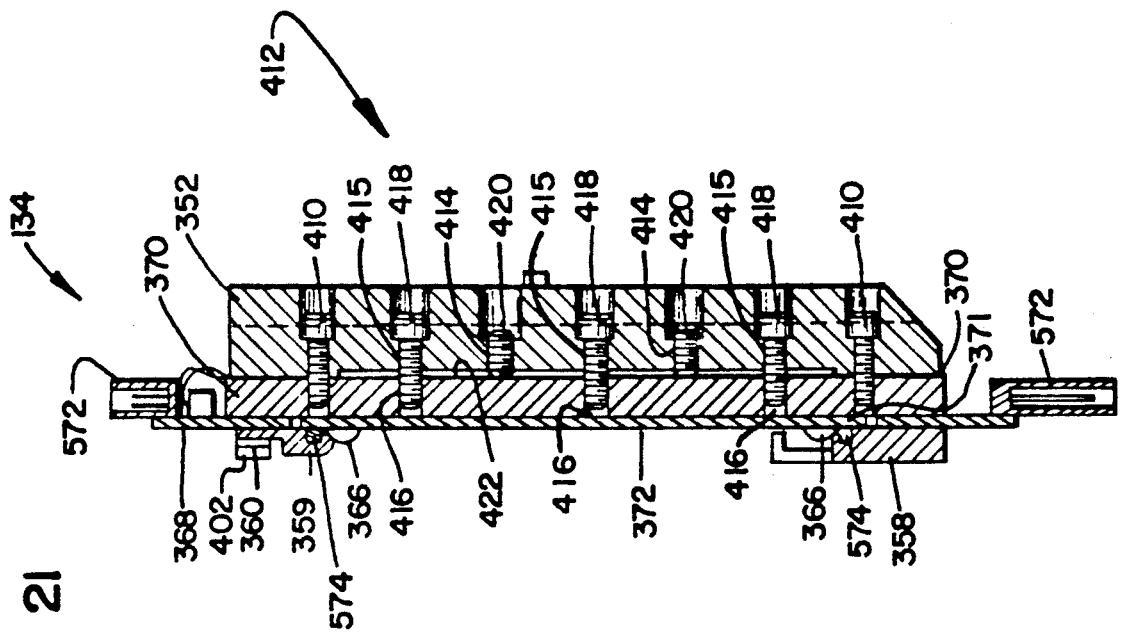
FIG. 21 is a cross-sectional view taken along lines 21—21 of FIG. 20.

In order to correct for tolerance deviations in the printing head 340, which may be slightly warped, the invention includes a novel prestressing arrangement 412, which is best shown in FIG. 21. According to the invention, backing block 352 is provided with, a multiplicity of threaded holes 414 and unthreaded holes 415 which extend toward the interface with heat sink 370 of the printing head 340. Heat sink 370 has a lesser number of threaded holes 416 defined therein which are aligned with the unthreaded holes 415 in backing block 352. In the illustrated embodiment, backing block 352 is provided with a total of two such threaded holes 414, and three unthreaded holes 415. Heat sink 370 is provided with three threaded holes 416 which are aligned with the unthreaded holes 415. Three adjustment bolts 418 are inserted into the corresponding unthreaded holes 415, and are threadable within the holes 416 which draws heat sink 370 and backing block 352 together at those discrete points. In the threaded holes 414, which are not aligned with corresponding holes in heat sink 370, compressive type jackscrews 420 are insertable which bear against a rear surface of heat sink 422 and are tightenable thereagainst so as to exert a compressive force, thereby urging heat sink 370 away from backing block 352 at those discrete points and tensioning the bolts 418. By suitably adjusting mounting screws 410 and jackscrews 420, deviations in tolerance of the printing head 340 obtained from a supplier may be corrected for, thereby improving the alignment of the printing head with print roller 135.

Backing block 352 is securely fixed to a support block 350 by a thumb screw knob connection 354, as is shown in FIG. 16. Support block 350 is pivotally mounted with respect to pivot plate 344 by a bearing 356. Pivot plate 344 is pivotally mounted with respect to frame 42 by a pivot plate bearing shaft 346 and is torsionally biased with respect to frame 42 by torsion spring 348, as has been previously described. Thus, a single link is achieved which allows the print head assembly to be pivoted away from the print roller for foil replacement and also allows the print head assembly to pivot and follow the minor imperfections of the print roller and minor card thickness variations.

As has been previously discussed, print roller 135 is mounted for rotation upon a shaft which is connected to the output pulley 104 of stepper motor $M_4$. Print roller 135 is aligned with thermal print line 374 and preferably has an outer resilient layer capable of supporting a workpiece against deflection relative to the thermal printing line during printing. In the preferred embodiment, print roller 135 is made of a 90 shore A durometer elastomer that has good friction characteristics and yet has some ability to allow for minor card thickness variations along the print head axis. This construction of print roller 135 in conjunction with the above-discussed measures for ensuring the alignment of printing head 340 results in a total mechanical deflection of the print head assembly relative to print roller 135 which is less than the critical value of approximately 0.0004 inches.

As previously discussed, the printing unit 130 includes a first set of printer feed rollers 334, 336 which are rotated by stepper motor $M_2$ through the first printer feed roller pulley 78 and eighth timing belt 116. As may be seen in FIG. 12, printer feed roller 334 has a resilient outer surface and is larger than roller 336, which has a vinyl or other high friction outer surface. Resilient roller 334 is mounted for rotation with pulley 78, and roller 336 is by rotated by friction applied by roller 334. Rollers 334 and 336 are biased together by a spring arrangement 338 which acts upon a bearing block in which the smaller roller 336 is constrained to rotate A second pair of rollers similar in shape to rollers 334 and 336 are provided on the same shafts which support those rollers, but are positioned beneath the work feed path and serve the purposes of aiding alignment and driving of the two shafts. The shafts supporting rollers 334, 336 are mounted in one-way pulley clutch bearings in a manner similar to the mounts for rollers 194, 196 so that the workpiece is driven at the speed of the fastest feed roller or print roller. The second feed roller pair 138 is likewise so mounted.

Referring now to exploded FIG. 5, a second set of printer feed rollers 138 includes a first upper print feed roller 298 having a resilient outer surface and a second upper print feed roller 308 having a vinyl or other high friction surface and a smaller diameter than roller 298. First upper print feed roller 298 is constrained to rotate with drive shaft 302, which also has a lower print feed roller 300 mounted thereon and is adapted to engage a second upper print feed roller 308 on support shaft 310 which supports roller 308 for rotation therewith. Drive shaft 302 for the first upper print feed roller 298 is connected to a pulley 108 which is adapted to be driven by stepper motor $M_2$ in a manner previously described. When $M_2$ turns drive shaft 302 responsive to an instruction from the control system, the first upper print feed roller 298 turns to help feed a workpiece out of the printer unit 130 and into the next station. At this time, second upper feed roller 308 and support shaft 310 turns due to friction of the workpiece or to friction between lower printer feed roller 300 and the lower roller 308 on shaft 310. Rollers 298 and 308 are biased toward each other by a compression spring 316 which is secured on a bearing guide 314 by a retaining ring 318 and acts against a bearing block 312 within which support shaft 310 is constrained to rotate. A lower print assembly card guide 296 is provided beneath rollers 298, 308 for ensuring straight passage of the workpiece along the work feed path.

Figure 15:
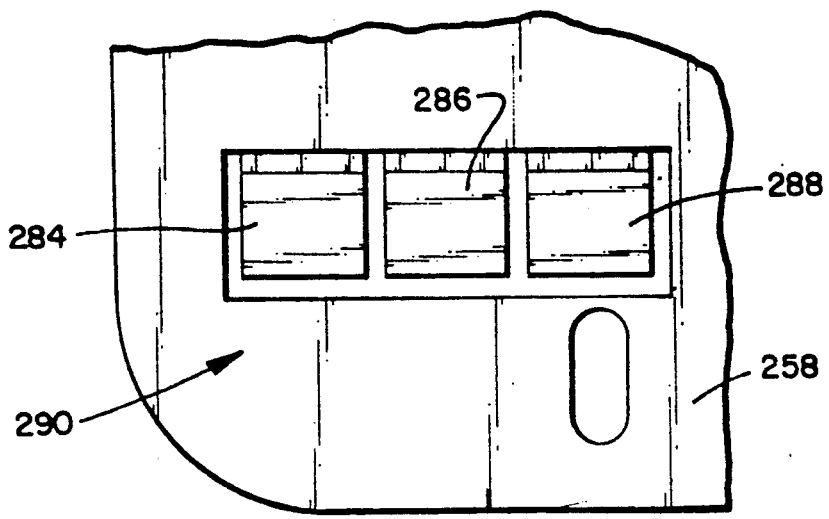
FIG. 15 is a fragmentary view of an indicating system on the cartridge assembly illustrated in FIG. 14.

Referring to FIGS. 13-15, the construction of the printing foil tape cartridge according to the invention will now be described As shown in the exploded view provided in FIG. 14, cartridge 140 includes a styrene outer casing 256 having an outer surface 258 and an inner surface 260. A pair of circular recesses are provided in both sides of outer casing 256 for receiving the first and second foil drive spindles 144, 146 shown in FIG. 13. Circular recesses 262 are preferably spaced so that their central axes are approximately three and one-half inches apart, as is shown by distance "A" in FIG. 14. A slot 264 is defined in outer casing 256 for receiving a photo detector $P_{10}$, which is best illustrated in FIG. 3. Each sides of the inner surface 260 of outer casing 256 have a pair of circular seating surfaces 266 defined therein for receiving first and second cylindrically shaped spool members 268, 270, as is shown in FIG. 14. Each of the spools 268, 270 have an inwardly extending rib 272 which is adapted to engage an outwardly extending projection on the respective foil drive spindles 144, 146. As is shown in FIG. 14, unused printing foil 142 is wrapped around first spool 268 for storage purposes. Preferably, a transparent warning leader is spliced to printing foil 142 on the end of the supply wrapped around spool 268. When the printing foil 142 is nearly exhausted, the transparent leader will pass by photosensor $P_{10}$, which will report the exhaustion of printing foil to the control system, as will be described below.

A first guide post 274 and a second guide post 276 are provided for guiding the printing foil 142 along a printing plane which is constructed for positioning between the thermal printing line 374 and print roller 135. A third guide post 278 is provided to guide foil 142 from first spool 268 to the first guide post 274. Likewise, a fourth guide post 280 is provided for guiding foil 142 from the second guide post 276 to the second spool 270, where the used printing foil is stored. As is shown in FIG. 14, all of the guide posts 274, 276, 278, 280 are constructed as thin hollow cylinders which are supported by studs which extend from the inner surface 260 of the outer casing 256.

Referring to FIG. 15, an indicating system for indicating what type of printing foil is contained in a cartridge is illustrated. Indicating system 290 includes a first tab 284, a second tab 286 and a third tab 288 which may be selectively punched out to encode such parameters as the printer energy level which corresponds to a particular type of printing foil. The provision of the three tabs 284, 286, 288 create a total of eight different combinations which may be read either manually or by a corresponding number of photosensors or switches.

Referring to FIG. 5, a switch assembly 322 is illustrated which includes three switches 326 adapted to detect which of the tabs 284, 286, 288 have been punched out of the outer surface 258 of a cartridge assembly 140. Switch assembly 322 is supported by a switch bracket 324 and is arranged to signal the control system as to the type of printing foil 142 contained in the cartridge, so that the appropriate power level or the like may be set automatically by the control system.

Printing foil 142 is preferably constructed of a first carrier layer, a backing layer on the carrier layer for contacting the thermal print line 374 and a pigmentation layer on the side of the carrier layer opposite the backing layer. According to the invention, the carrier layer may be formed of either polyester or polyethylene terephalate. The backing layer is preferably formed of a cross-linked silicon. The pigmentation layer includes a thermal transfer ink of the type which reacts exothermically to heat applied by the thermal print line 375, whereby printing may be effected without melting any portion of the printing foil. A back coated printing foil is sold by Coding Products of Michigan, under the product designation TTR-59CM.

Figure 7:
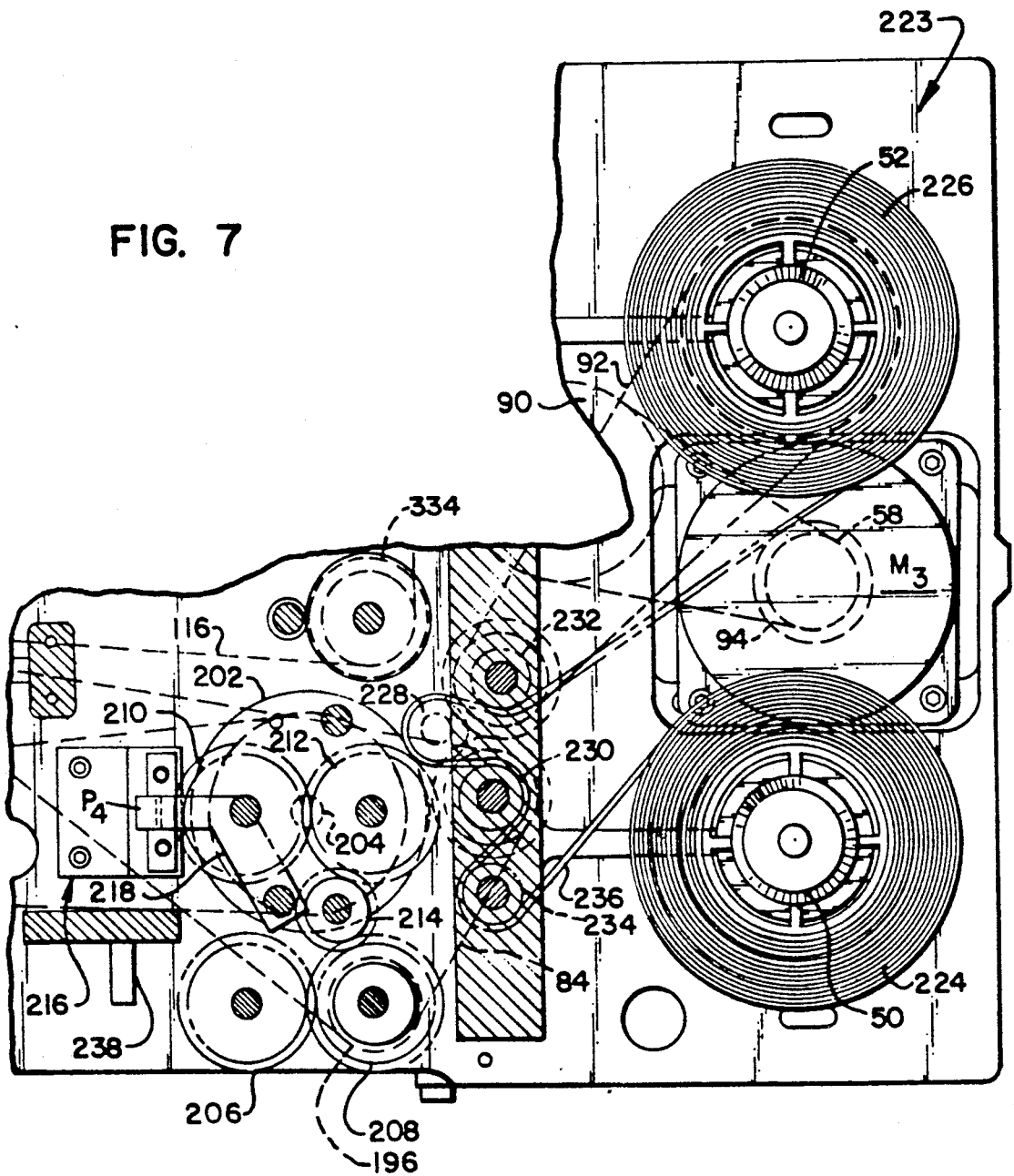
FIG. 7 is a fragmentary top plan view of a portion of the assembly illustrated in FIG. 3, taken in cross-section generally along lines 7—7 in FIG. 6.
Figure 10:
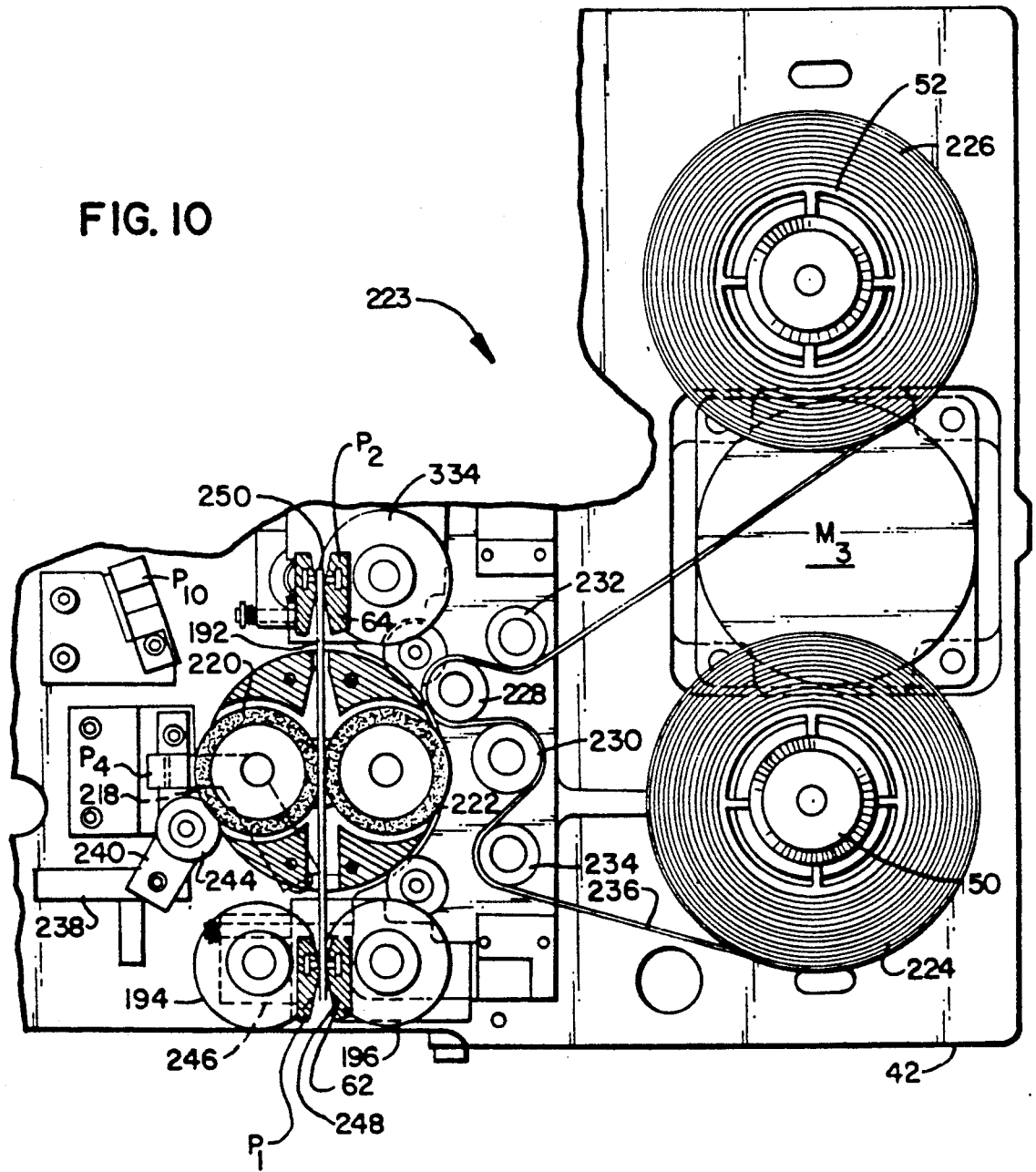
FIG. 10 is a view similar to FIG. 7 and 9, with additional parts broken away for clarity.
Figure 11:
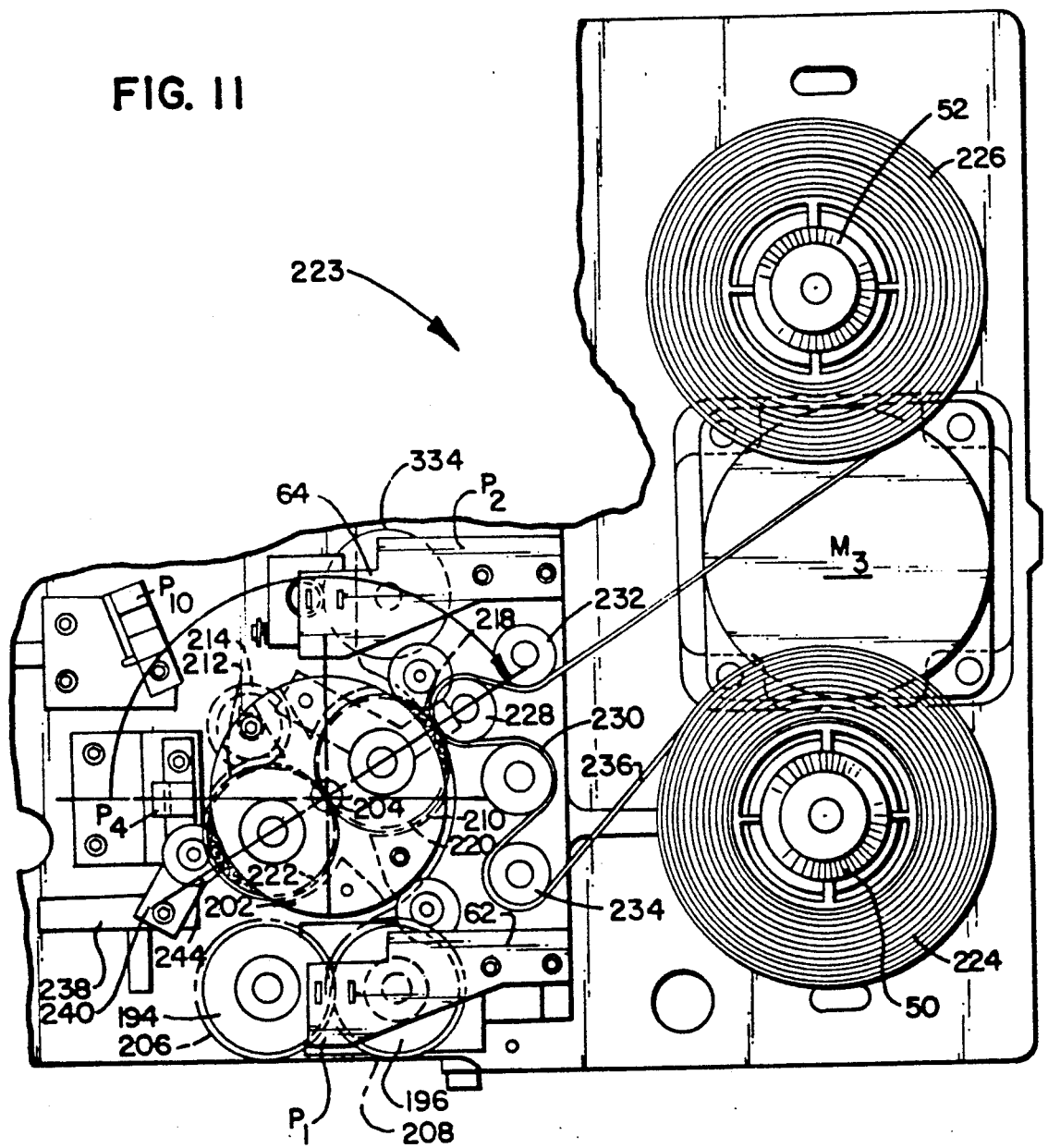
FIG. 11 is a view similar to FIG. 7 and 9, with the stripper assembly shown in a second stripping position.

Referring now to FIGS. 3 and 7, the cleaning unit 132 of graphic station 122 will now be described. As was previously described, a first feed roller 194 and second feed roller 196 are mounted for synchronized rotation beneath a first top edge guide member 62 and are biased toward each by a feed roller biasing spring 246, as is shown in FIG. 10. Second feed roller 196 is rotated by stepper motor $M_2$ through second timing belt 84 and the feed roller input pulley 80. A second gear 208 is mounted to rotate with second feed roller 196 and feed roller input pulley 80 and is intermeshed with a first gear 206 which is in turn mounted for rotation with the first feed roller 194. Accordingly, rotation of the first feed roller 194 is synchronized with the second feed roller 196. Turret body 202 is supported for rotation with a turret body shaft 204 that is connected with turret input pulley 72. As a result, turret body 202 may be rotated by stepper motor $M_2$ as has previously been described.

A first cleaning roller 220 and a second cleaning roller 222 are mounted for rotation on turret body 202, as is shown in FIG. 3. As shown in FIG. 7 third gear 210 is mounted for rotation with first cleaning roller 220, and a fourth gear 212 is likewise mounted for rotation with the second cleaning roller 222. Fourth gear 212 and third gear 210 intermesh so as to ensure synchronization between the first and second cleaning rollers 220, 222. The shafts supporting rollers 194, 196 are mounted in one-way pulley clutch bearings which allow the rollers to turn only in the feed direction, and allow the rollers to be driven in the feed direction at a speed greater than provided by their shaft, so the workpiece will be driven at the speed of the fastest roller. Turret body 202 further supports a transfer gear 214 which intermeshes with both second gear 208 and fourth gear 212 when the turret is in the position illustrated in FIG. 7, which is the normal work feed position. As a result, cleaning rollers 220, 222 will be synchronized with the first and second feed rollers 194, 196 when a card workpiece is being fed through the cleaning unit 132, and share the one-way clutching action described above.

In order to monitor the rotational position of turret body 202, a turret position detector 216 is provided which consists of a turret flag 218 extending radially from the turret body 202 and a photosensor $P_4$ for detecting the position of the turret flag 218. Photosensor $P_4$ is monitored by the control system in a manner that will be described below.

In order to remove particulate matter which has collected on the cleaning rollers 220, 222 during use, a stripper system 223 is provided. Stripper system 223 includes a length of stripper tape 236 which is arranged in a first stripper tape supply reel 224 and a second stripper tape stores reel 226. First stripper tape supply reel 224 is adapted to be non-rotatably received over the first stripper tape spindle 50, and second stripper tape reel 226 is adapted to be non-rotatably received over second stripper tape spindle 52. As has been previously described, a stripper roller 228, a first stripper guide roller 230, a second stripper guide reel 232 and a third stripper guide reel 234 are provided in cleaning unit 132. First stripper guide roller 230 has an outer diameter of 0.500 inches and second stripper guide roller 232 has an outer diameter of 0.510 inches. It is important that the diameter of the second roller be greater than the first roller so that the tension is maintained in the stripping tape during cleaning. As may be seen in FIG. 7, stripper tape 236 is guided from supply reel 224 over the third stripper guide roller 234, back around the first stripper guide roller 230, so that it winds around stripper roller 228, and then curves around second stripper guide roller 232 on its way to the second stripper tape reel 226.

In order to remove particulate matter from a card passing through the cleaning unit 132, cleaning rollers 220, 222 are provided with an adhesive coating and are preferably made from 20 to 30 durometer shore A urethane rubber. As the card passes between the rollers, the debris accumulates on the surface of the rollers and must be removed by the stripper system 223. To effect this, stripper tape 236 has one surface thereof coated with a substance that is more adhesive than the surface of cleaning rollers 220, 222. The adhesive surface of stripper tape 236 is arranged to face away from stripper roller 228, so that it is facing the cleaning rollers 220, 222.

In order to provide stability to the turret body 202 as it is rotated about shaft 204, a plurality of turret support bearings are provided. For example, as may be seen in FIG. 3, a bearing support block 240 is fixably mounted to a structural support 238 and has a turret support bearing 244 rotatably mounted thereon which abuts a circumferential side surface of the turret body 202. In the illustrated embodiment, three such bearings are provided which give a great deal of stability to the turret body 202.

Figure 8:
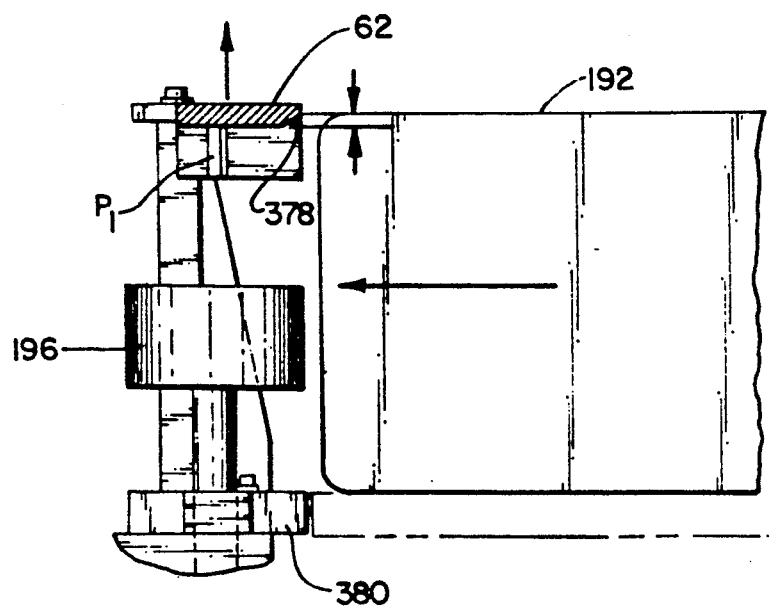
FIG. 8 is a fragmentary cross-sectional view taken along lines 8—8 in FIG. 3.

Referring to FIG. 10, first top card guide 62 includes a pair of ramped slots 248 which center a workpiece card entering the cleaning unit 132. Second top card guide 64 likewise has a ramped top slot 250 provided therein for similar purposes As may be seen in FIG. 10, photosensors $P_1$ and $P_2$ are built into the first and second top card guides 62, 64, respectively. Referring to FIG. 8, the first top edge guide 62 has a chamfered leading edge 378 which engages the front surface of a workpiece card entering therein. Second and third top edge card guides 64, 68 likewise are provided with a chamfered edge. When a card 192 enters beneath one of the top edge guides 62, 64, 68, the cantilevered arm supporting the top edge guide deflects upwardly, thereby exerting a downward bias onto the card which keeps the card in a proper position. For example, first top edge guide 62 exerts a downward bias onto card 192 which presses the card firmly onto bottom edge guide 380, as is shown in FIG. 8.

Figure 22:
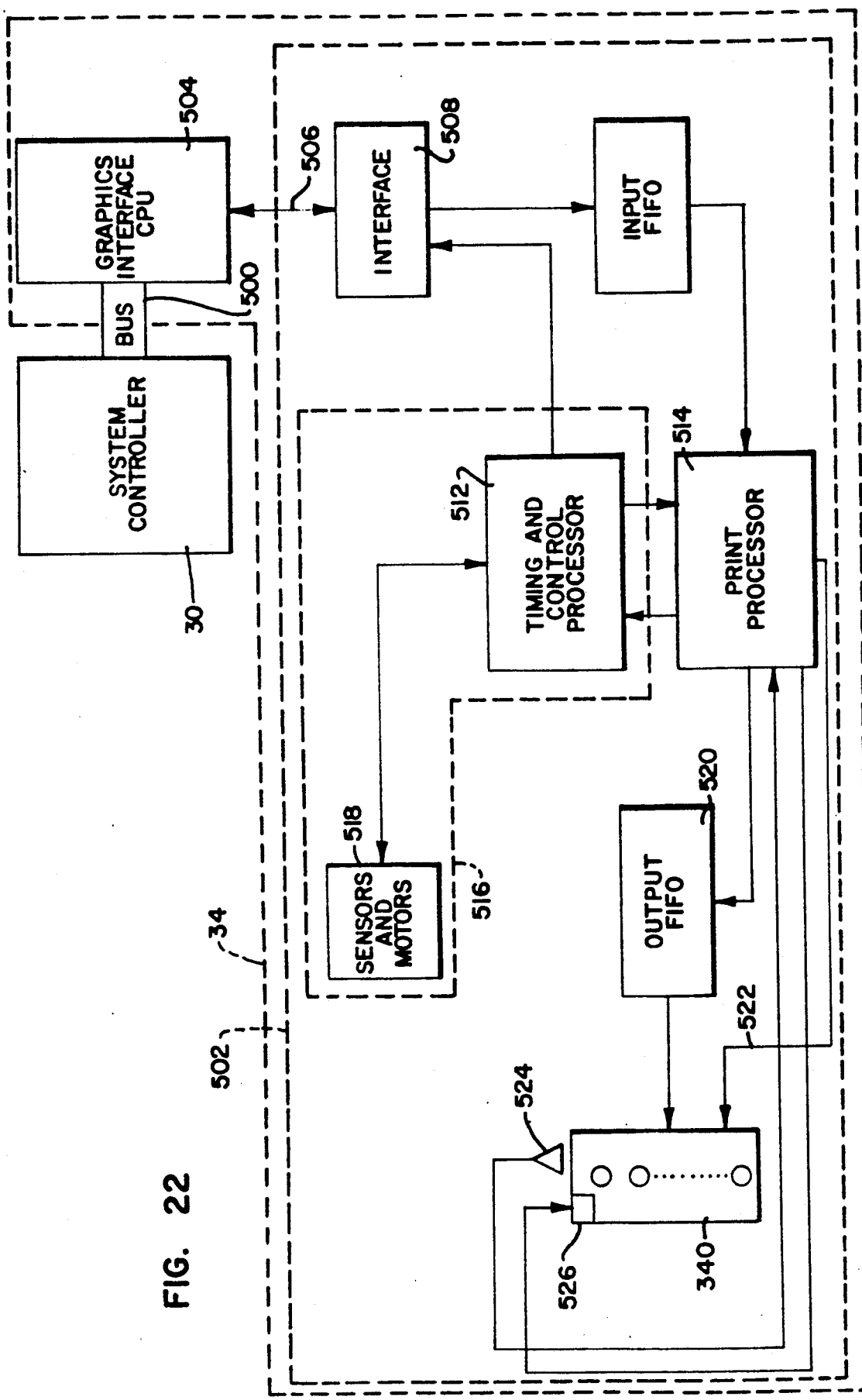
FIG. 22 is a detailed schematic block-type diagram of a portion of the control system illustrated in FIG. 2 for controlling the graphic station illustrated in FIG. 3.

Referring to FIGS. 2 and 22-26, the control system for graphic station 22 will now be described. As is shown in FIG. 22, system controller 30 communicates with a print engine 502 via a communications bus 500. Print engine 502 includes the above-described print head structure including printing head 340 and the above-discussed drive electronics 366. Print engine 502 of the preferred embodiment applies card image data to the plastic cards through the use of fixed array thermal transfer technology. The print engine 502 is equipped with a custom thermal print head 340, as described above, providing a single "column" of dot or thermal print elements 376 which are vertically oriented with respect to the printing surface. The dots 378 are resistive elements that, when turned on, heat up a foil and transfer ink from a carrier coating. The dot elements remain off at areas left blank. Each dot element is controlled by a binary digit supplied to the print head 340, wherein a binary "1" means the corresponding dot element 378 is turned on and a binary "0" means the corresponding dot element is turned "off".

The thermal print head 340 is the most vulnerable component in the print engine 502, so steps which increase the life span of the print head 340 increase the cost effectiveness of the print engine 502. The goals of the present invention, therefore, are to (1) optimize print quality and consistency while (2) minimizing the electric and thermal stress on the print head 21.

Figure 23:
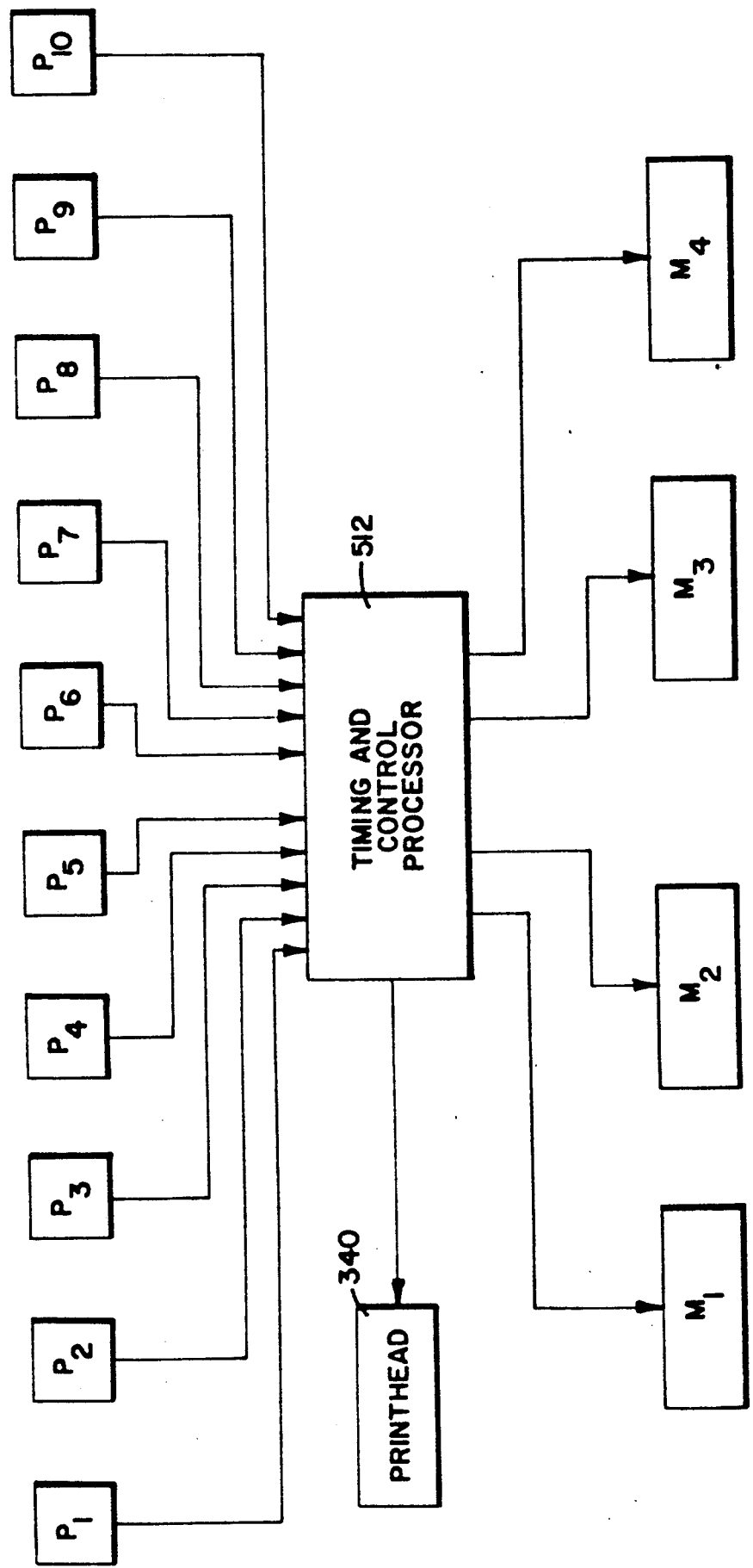
FIG. 23 is a schematic block-type diagram detailing a portion of the control system illustrated in FIG. 22.
Figure 24:
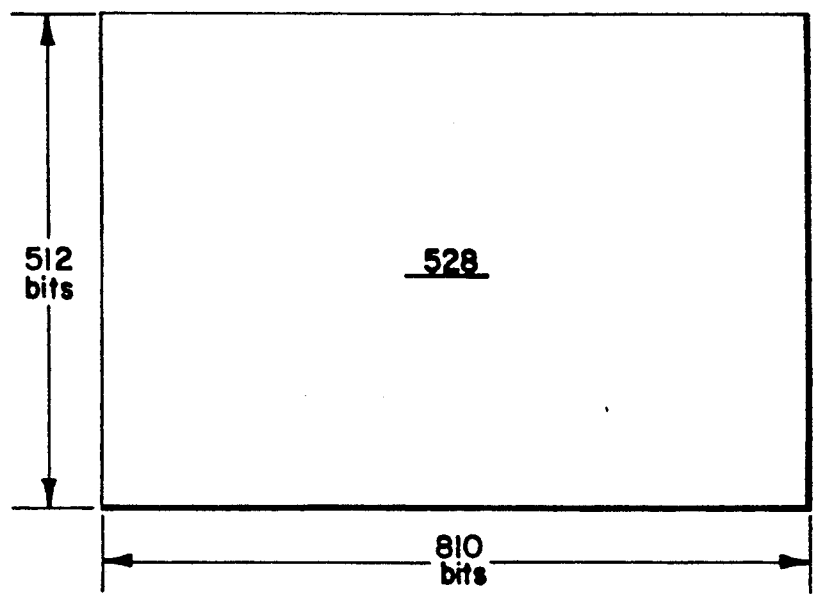
FIG. 24 is a depiction of a card image buffer according to the control system of the invention.

FIG. 22 is an overall schematic depiction of the print engine 502, along with system controller 30 and graphics control CPU or card 34. Cards are delivered to the print engine 502 by the upstream cleaning unit 132. The card is first moved to the print position by the feed rollers 334, 336 and during printing the card is moved by the print roller 135, as is described above. Upon completion, the card is moved out of the print engine 502 by the feed rollers. The progress of the card through the system is monitored by sensors $P_1$, $P_2$ and $P_3$, as is represented in FIG. 23. The print head 340 is brought into contact with the plastic card at the column dictated by a "starting column" value sent by the system controller 30. The card image is printed until the "ending column" value is reached, which value is also transmitted from the system controller. The starting column and ending column quantities have default values of column No. 1 and No. 810, respectively. FIG. 24 depicts a card image 528. A column consists of 512 bits numbered 0–511, wherein bit 0 represents the lower left corner of the image and bit 511 represents the upper left corner of the image. A row consists of 810 columns numbered 0-809, wherein column 0 begins on the left side of the card image buffer 528.

A graphics interface CPU 504 converses directly with the system controller 30 when the system controller 30 wishes to print a card image. The graphics interface CPU 504 stores the card image in a RAM buffer, and converses with the print engine 502 via cable 506 and an interface 508. The interface 508 delivers data and commands from the system controller 30 to the print engine 502. The interface 508 is concerned with five elements: the transfer request message; the transfer acknowledge message; input FIFO 510 buffer selection; a write strobe; and an 8-bit parallel data interface. The transfer request message is sent by the print engine 502 to the graphics interface CPU 504 to request the current column of data and the previous three columns of data. The graphics interface CPU 504 responds with the data and a transfer acknowledge message. The interface 508 is responsible for loading the input FIFO 510 properly. This requires that the first 256 bits of each column of data be written to the first buffer in the input FIFO 510. Next, the interface 508 de-selects the first buffer, selects the second buffer, and transmits the remaining 256 bits of each column of data into the input FIFO 510. This is repeated for each column of data. The write strobe signal strobes the 8-bit parallel data into the chosen input FIFO 510 buffer.

The print head 340 is driven by two separate buffers in an output FIFO 520. Each buffer is loaded separately and serially by the print processor 514 which reads the data from the input FIFO 510. In terms of card progress through the system, the print engine 502 waits until the card has reached sensor $P_2$ and then requests three consecutive columns from the graphics interface CPU 504. This action buffers data in the input FIFO 510 and the output FIFO 520. The timing and control processor 512 is responsible for synchronizing the print head 340 with the cards position, based upon the sensor and stepper motor signals 518. The sensor and stepper motor signals 518 first indicate that the card is positioned at the print head 340. The timing and control processor 512 monitors subsequent signals 518 indicating each column advance of the card, and interrupts the print processor 514 which activates the print head strobe 522 accordingly. Once card printing begins, subsequent data is requested on a column-by-column basis from the graphics interface CPU 504. The interface 508 is responsible for keeping pace with the printing process. As mentioned herein earlier, during the printing of a card image, each column requires that the three previous column of data, as well as the current column of data, be sent to the print engine 502. The print processor 514 uses this historical data to provide thermal hysteresis control for each dot element in the print head 340. The past history of each dot element for the previous print cycles is used to calculate the exact energy necessary to the raise the dot element temperature to the ideal printing temperature. The energy supplied to the print head 340 is controlled by dividing the print head strobe 522 into five mini-phases. These five mini-phases are: 1) the transparent phase; 2) three compensation phases; and 3) the preheat phase. The Boolean algebra that describes the logic for determining when a mini-phase is "on" is in the lower portion of FIG. 26, generally identified by reference numeral 550. The transparent phase is the first data loaded into the print head 340 by the print processor 514 and the longest print head strobe 522 by the print processor 514. This data, loaded into the output FIFO 520, is the current column of data read from the input FIFO 510. The compensation phases are of equal time duration and yield active dot elements within the print head 340 depending upon the past history of each dot element. Whether a dot element is turned "on" during a compensation phase depends on whether the transparent phase is "on" for the current column and whether the dot element was "off" during the previous columns printed. The dot element is turned "on" for the first compensation phase if it was "off" during the first prior column (i.e., one column earlier). The dot element is turned "on" for the second compensation phase if it was "off" during the first and second prior columns (i.e., one and two columns earlier). The dot element is turned "on" for the third compensation phase if it was "off" during the first, second, and third prior columns (i.e., one, two, and three columns earlier).

The preheat phase is used to reduce the differential temperature stress on a dot element. The preheat phase occurs if a dot element is "off" for the entire hysteresis (i.e., if the dot element is "off" in the current column and it was "off" during for all three prior columns). A preheat phase is required because the transfer temperature of the foils utilized in the preferred embodiment are higher than the typical thermal media. This higher transfer temperature, coupled with the need to eliminate density variations as a function of ambient temperature, dictates the need for methods of preheating dot elements in the print head 340 to further reduce the differential temperature stress. Preheating dot elements in the print head 340 also reduces the need to vary the applied energy within the print pulse as a function of the ambient temperature, as discussed herein later.

FIG. 26 provides an example of the logic used by a print processor 514 to determine how many mini-phases should be generated. At the top of FIG. 26 is an example "past history" for a dot element, generally identified by reference numeral 546. Beginning on the left side of the diagram, the printer begins from a cold start. For the next 11 print cycles after a cold start, the example dot element is "on" for one cycle, "off" for two cycles, "on" for one cycle, "off" for one cycle, "on" for two cycles, and "off" for four cycles.

Underneath each cycle indicator of "on" or "off" is a reference numeral, 552-566 and 576-580. These reference numerals correspond to the timing diagrams in FIG. 26, generally identified by reference numeral 548. The first timing diagram illustrates the print head strobe 522, which is an inverted signal. The following timing diagrams illustrate the mini-phases for each print cycle.

In timing diagram 552, the first print cycle after a cold start, the current column is "on" resulting in an active transparent phase 530. Because there are no prior columns of data to be used in determining how many mini-phases should be generated, three "initialization" columns are transferred by the graphics interface CPU 504, wherein each column consists of all "off" dot elements. Therefore, the transparent phase 530 is concatenated with compensation phases 532, 534 and 536.

In timing diagram 554, the second print cycle after a cold start, the current column is "off" resulting in an off transparent phase 530. Compensation phases 532, 534 and 536 are "off" because the transparent phase 530 is "off". The preheat phase 538 is "off" because the first prior column was "on".

In timing diagram 556, the third print cycle after a cold start, the current column is "off" resulting in an "off" transparent phase 530. Compensation phases 532, 534 and 536 are "off" because the transparent phase 530 is off. The preheat phase 538 is "off" because the second prior column was "on".

In timing diagram 558, the fourth print cycle after a cold start, the current column is "on" resulting in an active transparent phase 530. Compensation phases 532 and 534 are "on" because the first and second prior columns were "off". The preheat phase 538 is "off" because the current column is "on" and the third prior column was "on".

In timing diagram 560, the fifth print cycle after a cold start, the current column is "off" resulting an "off" transparent phase 530. Compensation phases 532, 534 and 536 are "off" because the transparent phase 530 is "off". The preheat phase 538 is "off" because the first prior column was "on".

In timing diagram 562, the sixth print cycle after a cold start, the current column "on" resulting in an active transparent phase 530. Compensation phase 532 is "on" because the current column is "on" and the first prior column was "off". The preheat phase 538 is "off" because the current column is "on" and the second prior column was "on".

In timing diagram 564, the seventh print cycle after a cold start, the current column is "on" resulting an active transparent phase 530. Compensation phases 532, 534 and 536 are "off" because the first and third prior columns were "on". The preheat phase 538 is "off" because the current column is "on" and the first and third prior columns were "on".

In timing diagrams 566, 576, 578 and 580, the eighth through eleventh print cycles after a cold start, all current columns are "off" resulting in an off transparent phase 530. Compensation phases 532, 534 and 536 are "off" because the transparent phase 530 is off. In timing diagram 580, the preheat phase 538 is "on" because the current column is "off" and all three prior columns were "off".

The print processor 514 is responsible for controlling the width of each print head strobe 522. Whenever one to three additional mini-phases are concatenated to the first mini-phase, based upon the past print history as described above, the concatenation results in very high electrical duty cycles. The print rate cannot be reduced to maintain a constant duty cycle in the face of dynamically changing individual pulse widths. The worse case can occur with a "cold dot" (i.e., a dot which has been "off" for the four print cycles of the hysteresis algorithm) where the transparent phase plus all three compensation phases are concatenated together to produce the print pulse. The danger is that the "cold dot" can create a peak dot temperature because of the dramatic increase in the duty cycle, which results from the mini-phase concatenation within a fixed overall print rate. The problem is exacerbated in the preferred embodiment because the high temperature transfer characteristics of the foil require higher energy than standard thermal media.

To overcome this problem, the invention allows the duty cycle, or pulse width, of individual mini-phases to be established and varied by the timing and control processor 512. The pulse width is initially determined by the thermal transfer characteristic of the foil being used. In an alternative embodiment, a foil type signal characterizing the thermal transfer temperature of the foil being used is input to the print processor 18. In an alternative embodiment, the foil type signal is used in conjunction with the thermistor 22 voltage to index into an extended look-up table. Different foils would have different thermal transfer characteristics requiring different energy levels. For example, different ink color will typically result in a foil having a different thermal transfer temperature. During printing, the temperature of the print head 340 is continuously monitored by the print processor 514 using thermistor 524. Thermistor 524 produces a voltage which varies with the temperature of print head 340. The print processor 514 uses the voltage in a compensation algorithm, indexing into a look-up table to retrieve values indicating the desired width of the print head strobe 522. The look-up table is created on the basis of empirical evidence. As a result, the print head strobes 522 associated with the mini-phases discussed above are adjusted by the print processor 514. Thus, the required foil transfer temperature can be reached while avoiding dangerously high peak temperatures by effectively integrating or time-multiplexing the power applied to the print head 340.

The print processor 514 computes all five mini-phases for the next column during the printing of the present column. The significance of this approach is that it decouples the minimum width of a mini-phase from the execution time required to generate a mini-phase. This is especially important given that the cycle time for a mini-phase is shortened at high temperatures, to the point where the cycle time can be less than the execution time for computing the mini-phase.

Figure 25:
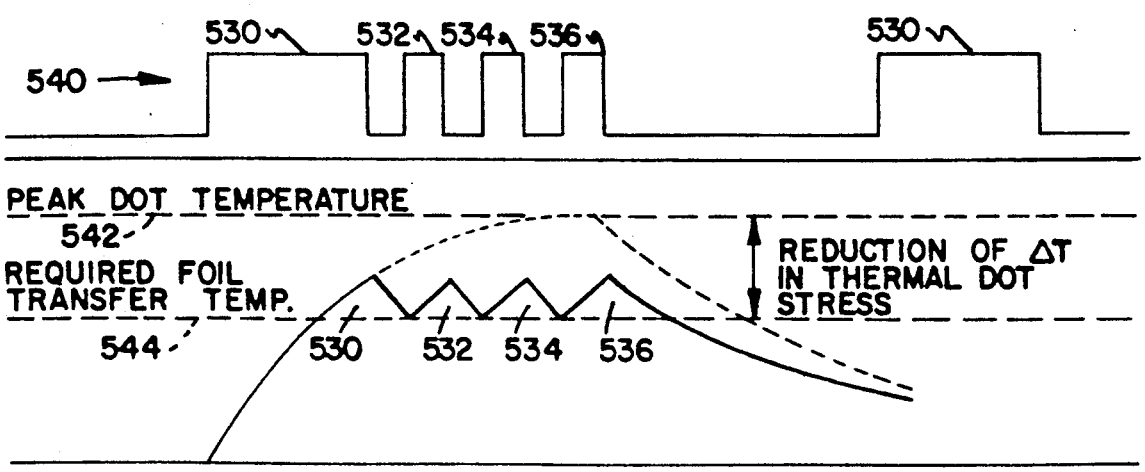
FIG. 25 is a temperature response diagram according to the control system of the invention.

The temperature response of each dot element due to the mini-phases is illustrated in FIG. 25 by the four pulses, generally referred to by reference numeral 540. Pulse 530, associated with the transparent phase, raises the dot element temperature above the required foil transfer temperature 544. However, pulse 530 does not provide enough energy to raise the dot element temperature above the peak dot temperature 542. When pulse 530 ends, the temperature of the dot element begins to drop. After a predetermined amount of time, pulses 532, 534 and 536 associated with the three compensation phases, are generated to keep the dot element temperature from falling below the required foil transfer temperature 544 or from rising above the peak dot temperature 542. In this way, the invention maintains the temperature of the dot element above the required foil transfer temperature 544, but below the peak dot temperature 542, thereby optimizing print quality but minimizing thermal stress. Although not shown in FIG. 25, the width of the preheat pulse 538, can also vary as a function of the print head 340 substrate temperature. Thus, during printing, the print processor 514 is able to uniquely establish the appropriate print pulse for each individual dot.

The final factor used in controlling print quality in thermal stress is preheating the print head 340. The resistance of the print head 340 to variations in the ambient temperature can be accomplished through the use of self-regulating thermistor heaters 526 which are mounted to the print head heat sink and spaced so as to provide even heat distribution. The print processor 514 receives signals from thermistor 524 indicating the substrate temperature of the print head 340, and, in turn, generates signals to the thermistor heaters 526 in an attempt to maintain the print head 340 at a constant optimal temperature. As a result, print head 340 is physically preheated to a constant background temperature, which allows the invention to operate in a more stable overall environment.

The system for controlling the various mechanical elements of cleaning unit 132 and printing unit 130 will now be described. As a card is introduced to cleaning unit 132 from a previous station such as the magnetic stripping station 20, photocell sensor $P_1$ reports the entry of the card to timing and control processor 512, which, in turn, informs system controller 30 via interface 508, cable 506, the graphics interface CPU 504 and communications bus 500. Timing and control processor 512 then instructs stepper motor $M_1$ to turn first and second feed rollers 194, 196 in order to feed the card through the first and second cleaning rollers 220, 222, which are rotated in synchronization with rollers 194, 196 in a manner described above. At this time, timing and control processor 512 and system controller 30 monitor the status of photocell sensor $P_4$ to verify that cleaning turret body 202 is in its home position. As the card is advanced through the cleaning station, timing and control processor 512 continues to monitor the status of photocell sensor $P_1$. If timing and control processor 512 determines that $P_1$ remains blocked for too long a time given the rotation of feed rollers 194, 196, the timing and control processor 512 will determine that the passage of the card has been blocked, which is a fatal error. In the case of a fatal error, timing and control processor 512 reports back to system controller 30, which ceases operation of the entire card producing system 10.

Figure 9:
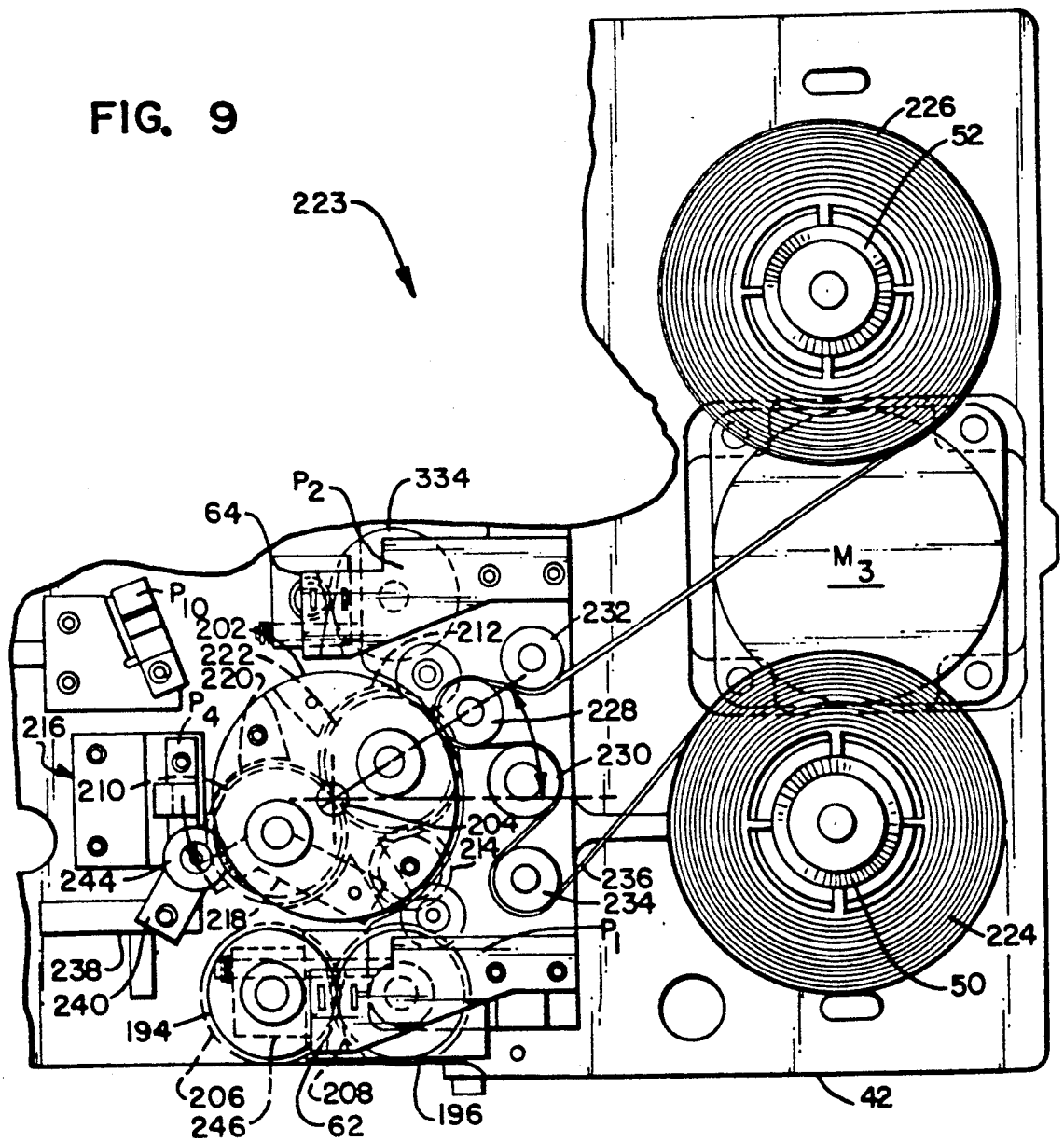
FIG. 9 is a view similar to FIG. 7 showing the stripper assembly of the invention in operation.

As the card continues to advance through the cleaning station, photocell sensor $P_2$ is monitored by timing and control processor 512, which instructs stepper motor $M_1$ to advance the card to an initial printing position responsive to signals received from $P_2$. At the time photocell sensor $P_2$ is no longer blocked by the card, timing and control processor 512 records passage of the card through the cleaning station. Timing and control processor 512 keeps count of the number of cards which have passed through the cleaning system since the occurrence of the last cleaning sequence. The cleaning event is triggered by the processed card count and this is estimated to be between 20 and 1000 cards, depending upon the anticipated cleanliness of the cards. At the time the processed card count reaches its predetermined limit, timing and control processor 512 instructs stepper motor $M_2$ to rotate the cleaning turret 202 by 30 degrees in a counterclockwise direction as viewed from the top of the turret body 202. FIG. 9 depicts turret body 202 in this position. This places the cleaning roller 222 in position to be cleaned by the stripper tape. At this time, the stepper motor $M_1$ is instructed to reverse in direction by timing and control processor 512 to run for a 720 degree rotation. This action drives the stripper tape past the cleaning roller 222 and removes particulate matter from cleaning roller 222. After this is completed, stepper motor $M_2$ is instructed by timing and control processor 512 to drive the turret body 202 330 degrees in the counterclockwise direction, which returns the turret body 202 to its home position. Timing and control processor 512 further monitors photocell sensor $P_4$ to verify that turret body 202 has indeed returned to the home position. At this time, timing and control processor 512 instructs stepper motor $M_1$ to feed another card through the cleaning rollers 220, 222. After this next card has been passed through photocell sensor $P_2$, timing and control processor 512 instructs stepper $M_2$ to rotate turret body 202 150 degrees in the clockwise direction, which places cleaning roller 220 in a position to have particulate matter removed therefrom. Timing and control processor 512 then instructs stepper motor $M_1$ to reverse direction and run for a 720 degree rotation, which drives the stripper tape past first cleaning roller 220. After this is completed, timing and control processor 512 causes stepper motor $M_2$ to rotate the turret 150 degrees in a counterclockwise direction, which returns turret body 202 to its home position. When timing and control processor 512 learns through photocell sensor $P_4$ that turret body 202 has returned to the home position, stepper motor $M_1$ is then instructed to drive a new series cards through cleaning rollers 220, 222.

As a card is moved into printing position, timing and control processor 512 checks photocell sensor $P_{10}$ to verify that printing foil is available. If printing sensor $P_{10}$ indicates that printing foil has been exhausted, timing and control processor reports back to system controller 30, which ceases operation of the entire card producing system 10 until which time timing and control processor 512 reports that the supply of printing foil has replenished.

Assuming sensor $P_{10}$ indicates that printing foil is available, timing and control processor 512 instructs stepper motor $M_3$ to rotate cam shaft 182 in the manner described above, to cause the thermal print head and printing line 374 to be biased against printing roller 135 by the compression type compression spring 166 and plunger 154. At this time, timing and control processor 512 monitors the cam shaft position photocell sensor $P_8$ to verify that cam shaft 182 has indeed moved off of its home position. Timing and control processor 512 then instructs stepper motor $M_4$ to drive the first and second foil printer spindles 144, 146 and the printer roller 135. At this time, timing and control processor 512 instructs print process 514 to begin the print algorithm in the manner described above. Timing and control processor 512 simultaneously monitors the movement sensor $P_6$ which is connected to first foil drive spindle 144 in order to verify that printing foil is indeed being fed. If motion sensor $P_6$ indicates that the first printer foil spindle 144 is not, in fact, moving during the printing process, timing and control processor 512 instructs system controller 30 that a fatal error has occurred, and the entire card producing system 10 is shut down. Timing and control processor 512 further monitors the toggle position photocell sensor $P_5$ during the entire printing process to ensure that plunger 154 is properly engaged against the pivot plate 344. If sensor $P_5$ indicates that the toggle mechanism is not properly positioned, timing and control processor 512 reports this back to system controller 30 which shuts down operation of the entire card producing system until which time timing and control processor 512 indicates to system controller 30 that the toggle mechanism is properly positioned.

When printing is completed, timing and control processor 512 instructs stepper motor $M_4$ to advance an additional 0.2 inches of printing foil to make sure that the printing foil separates from the card, and instructs stepper motor $M_3$ to advance cam shaft 182 to its home position. The cam shaft photosensor flag $P_8$ is monitored by timing and control processor 512 to verify that cam shaft 182 has indeed returned to its home position.

In addition, photosensor $P_3$ is monitored by timing and control processor 512 during the printing process to verify that it has been blocked by the card at the proper time during printing. If photocell sensor $P_3$ does not so indicate, timing and control processor 512 assumes that jamming has occurred, and reports a fatal error back to the system controller 30, which shuts down operation of the entire card producing system 10. After printing the card, the timing and control processor 512 instructs M₂ to drive the card from the printer roller 135 through second print feed roller pair 138. As the card clears P₃, the processor notifies system controller 30 that processing of the card has been completed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for printing a graphic design on a hard plastic work piece, comprising:
    means for feeding the work piece along a straight linear work feed path;
    particle removing means positioned alongside the linear work feed path for removing and collecting loose particles from at least one surface of the work piece;
    means positionable adjacent the linear work feed path for printing a pattern on the work piece, said printing means comprising a thermal mass transfer type printer having a print head element positionable adjacent the linear work feed path and having a thermal print line thereon facing the work feed path, said thermal print line having a multiplicity of resistive heat generating elements therein, said printing means further comprising means for feeding a thermal printing foil between said thermal print line and the work feed path;
    means for providing an accurate self-alignment of said print head element with respect to said linear work feed path so that said print head element is adapted to bear against the work piece at a constant pressure;
    means for permitting said print head element to be quickly installed on said means for providing self-alignment; and
    means for controlling said work piece feeding means and said printing means to print a predetermined design on the work piece.

2. Apparatus according to claim 1, wherein said work piece feeding means comprises a first pair of printer feed rollers; a second pair of printer feed rollers aligned with said first pair of printer feed rollers along the linear work feed path; and means for driving said first and second pairs of printer feed rollers.

3. Apparatus according to claim 2, wherein said work piece feeding means further comprises printer backup guide means positioned opposite the work feed path from said printing means for supporting the work piece against deflection resulting from contact with said printing means.

4. Apparatus according to claim 3, wherein said backup guide means comprises a driven print roller having a resilient outer surface.

5. Apparatus according to claim 2, wherein said work piece feeding means further comprises means secured to said printing means for supporting and guiding a lower edge to the work piece.

6. Apparatus according to claim 2, wherein said driving means comprises a stepper motor having a timing pulley connected thereto, additional timing pulleys connected to one roller of each of said first and second printer feed roller pairs, respectively, and a timing belt operatively connecting said three pulleys.

7. Apparatus according to claim 2, wherein said work piece feeding means further comprises means for guiding a top edge of the work piece along the work feed path.

8. Apparatus according to claim 7, wherein said work piece feeding means further comprises means for guiding a bottom edge of the work piece along the work feed path.

9. Apparatus according to claim 8, wherein said work piece feeding means further comprises means for biasing said top edge guiding means downwardly, whereby the work piece is securely positioned between the top edge guide means and bottom edge guide means.

10. Apparatus according to claim 2, wherein said work piece feeding means further comprises means for biasing said printer feed rollers of each of said printer feed roller pairs toward each other, respectively.

11. Apparatus according to claim 1, further comprising a thermal printing foil said thermal printing foil has a first carrier layer, a backing layer on said carrier layer for contacting said thermal print line and a pigmentation layer on the side of said carrier layer opposite said backing layer.

12. Apparatus according to claim 11, wherein said carrier layer is formed of polyester.

13. Apparatus according to claim 11, wherein said carrier layer is formed of polyethylene terephalate.

14. Apparatus according to claim 11, wherein said backing layer is formed of cross-linked silicone.

15. Apparatus according to claim 11, wherein said pigmentation layer includes a thermal transfer ink of the type which reacts exothermically to heat applied by said thermal print line.

16. Apparatus according to claim 1, wherein said feeding means comprises means for supplying a thermal printing foil to said printing foil feeding means; means for storing said foil after use; and means for guiding said foil from said supplying means to a path between said thermal print line and the work feed path and into said storing means.

17. Apparatus according to claim 16, wherein said controlling means comprises means for sensing when said supplying means has been exhausted of foil; and means for discontinuing operation of the apparatus responsive to said sensing means.

18. Apparatus according to claim 17, wherein said controlling means further comprises means for resuming operation of the apparatus when said sensing means indicates said supplying means has been replenished.

19. Apparatus according to claim 16, wherein said work piece feeding means further comprises cassette means for housing said supplying means and said storing means.

20. Apparatus according to claim 19, wherein said cassette means includes means for indicating the type of printer foil contained therein, whereby a proper energy level may be provided to the printing means.

21. Apparatus according to claim 20, wherein said controlling means includes means for determining the status of said indicating means.

22. Apparatus according to claim 20, wherein said cassette means includes a hard plastic casing, and said indicating means comprises tabs formed on said casing which may be broken off to indicate the type of printer foil.

23. Apparatus according to claim 22, wherein there are three of said tabs.

24. Apparatus according to claim 19, wherein said supplying means comprises a first spool on said cassette means about which unused printing foil is wound and said storing means comprises a second spool on said cassette means about which used printing foil is wound.

25. Apparatus according to claim 24, wherein said guide means includes means for guiding used printer foil into said second spool.

26. Apparatus according to claim 24, wherein said controlling means includes means for sensing movement of said first spool, and means for discontinuing operation of the apparatus if said sensor does not detect movement when said printing means is in operation.

27. Apparatus according to claim 24, wherein said supplying means further comprises means for engaging said first spool so as to be rotatably fixed with respect thereto.

28. Apparatus according to claim 27, wherein said supplying means further comprises friction clutch means for frictionally retarding rotation of said first spool, whereby tension is maintained in said printing foil during feeding.

29. Apparatus according to claim 24, wherein said guide means comprises idler means on cassette means for guiding said foil along the path between said thermal print line and the work feed path.

30. Apparatus according to claim 29, wherein said idler means comprises a pair of idler guides, said idler guides being positioned on opposite sides of said print head element.

31. Apparatus according to claim 30, wherein said guide means includes means for guiding used printer foil from one of said idler guides into said second spool.

32. Apparatus according to claim 31, wherein said means for driving used printer foil comprises a pair of driven rollers.

33. Apparatus according to claim 32, wherein said work piece feeding means further comprises means for turning both said second capstan and said driven rollers in a timed relationship.

34. Apparatus according to claim 33, wherein said work piece feeding means includes a backup roller positioned opposite the work feed path from said printing means, and said turning means further is for turning said backup roller in timed relationship to said driven rollers and said second capstan.

35. Apparatus according to claim 1, further comprising frame means for supporting said feeding means, said printing means and said aligning means.

36. Apparatus according to claim 35, wherein said means for providing an accurate self-alignment comprises a support block; a pivot plate; means for pivotally mounting said pivot plate to said frame means; means for pivotally connecting said support block and pivot plate; and means for securing said print head element to said support block.

37. Apparatus according to claim 36, wherein said means for providing accurate self-alignment further comprises means for pivotally resiliently biasing said pivot plate away from the work feed path.

38. Apparatus according to claim 1, wherein said controlling means comprises means for monitoring the temperature of said printing means, and means for discontinuing operation of the apparatus if said temperature exceeds a predetermined value.

39. An apparatus according to claim 1, wherein said printing means further comprises a pair of electronics modules which are positioned above and below the work feed path to permit unimpeded passage of the workpiece.

40. Apparatus according to claim 1, wherein said particle removing means for removing and collecting loose particles from at least one surface of the work piece comprises:
cleaning means having at least one engaging surface adapted for engaging the surfaces of the work piece to be cleaned;
adhesive means on said engaging surface for adhesively attracting loose particles from the corresponding surface of the work piece to be cleaned;
means adapted for feeding a work piece to said cleaning means; and
means for removing collected particles from said cleaning means.

41. Apparatus according to claim 40, wherein said cleaning means comprises at least one cleaning roller having an adhesive outer surface for engaging the surfaces of the work piece to be cleaned.

42. Apparatus according to claim 40, wherein said work piece feeding means comprises first and second work feed rollers; and means for turning said work feed rollers.

43. Apparatus according to claim 40, further comprising means for controlling at least one of said cleaning means, said work piece feeding, and said particle removing means.

44. A method of printing a graphic design on a hard plastic work piece, comprising, in order:
(a) installing a print head in a resistance type thermal printer so that a print head element in the printer is adapted to be precisely aligned with respect to a straight linear work feed path;
(b) feeding the work piece along the work feed path;
(c) removing and collecting loose particles from at least one surface of the work piece as the work piece moves along the work feed path;
(d) precisely aligning a printing surface of the print head element with the surface of the work piece which is to be printed upon;
(e) controlling the printer to print on the desired work piece surface while continuing to feed the work piece past the printer; and
(f) moving the work piece away from the printer.

45. A method according to claim 44, further comprising the step of detecting the presence of the work piece prior to step (d) and wherein step (d) is performed responsive to the detection of the work piece.

46. A method according to claim 44, wherein said aligning step further comprises:
mounting the thermal printer on a backing block; and selectively pulling or pushing predetermined portions of the backing block with respect to corresponding portions of the thermal printer, whereby irregularities in the printing surface of the thermal printer are corrected for.

47. A method according to claim 46, wherein said aligning step further comprises:
releasably biasing the thermal printer toward the workpiece.

48. A method according to claim 47, wherein said aligning step further comprises the step of selectively urging the thermal printer away from the work feed path.

49. A method according to claim 48, further comprising the step of detecting the presence of the work piece prior to step (d); and performing said urging step responsive to said detecting step.

50. A method according to claim 44, wherein said aligning step further comprises:
releasably biasing the thermal printer toward the workpiece.

51. A method according to claim 50, wherein said biasing step is performed by a spring-biased releasable plunger, further comprising the steps of:
monitoring the position of the plunger; and
discontinuing performance of the method if the plunger is in a released position.

52. A method according to claim 50, wherein said aligning step further comprises the step of selectively urging the thermal printer away from the work feed path.

53. A method according to claim 52, further comprising the step of detecting the presence of the work piece prior to step (d); and performing said urging step responsive to said detecting step.

54. A method according to claim 52, wherein said urging step is performed by a cam arrangement, and further comprising the steps of:
monitoring the position of the cam arrangement; and
discontinuing performance of the method if the cam arrangement is in an improper position.

55. A method according to claim 44, wherein the thermal printer includes a supply of printing foil, further comprising the steps of:
monitoring the thermal printer foil supply; and
discontinuing performance of the method if the supply is exhausted.

56. A method according to claim 55, including the additional steps of:
continuing to monitor the thermal printer foil supply after performance of the method has been discontinued; and
resuming performance of the method if said continued monitoring indicates replenishment of the foil supply.

57. A method according to claim 44, wherein the thermal printer includes a first reel and spool for supplying thermal printing foil, and a second reel and spool for storing used thermal printing foil, further comprising the steps of:
sensing whether the first spool is moving during said printing step; and
discontinuing performance of the method if the spool is not moving.

58. A method according to claim 44, further comprising the steps of:
monitoring the temperature of the thermal printer during the printing step; and
discontinuing performance of the method of the monitored temperature exceeds a predetermined value.

59. Apparatus according to claim 40, wherein said particle removing means comprises a stripping element having stripping means thereon for stripping particles from said cleaning roller, and means for selectively causing engagement between said cleaning rollers and said stripping means.

60. An apparatus for printing a graphic design on a hard plastic work piece, comprising:

means for feeding the work piece along a straight, linear work feed path, said feeding means comprising a first pair of print feed rollers; a second pair of printer feed rollers aligned with said first pair of rollers along the work feed path and means for driving said first and second pairs of rollers;
means positionable and adjacent the work feed path for printing a pattern on the work piece, said printing means including a print head element;
means for providing an accurate self-alignment of said print head element with respect to said linear work feed path so that said print head element is adapted to bear against the work piece at a constant pressure;
means for permitting said print head element to be quickly installed on said means for providing self-alignment; and
means for controlling said feeding means and said printing means to print a predetermined design on the work piece, wherein said feeding means further comprises means for biasing said printer feed rollers of each of said printer feed roller pairs toward each other, respectively.

61. An apparatus for printing a graphic design on a hard plastic work piece, comprising:
means for feeding the work piece along a work feed path;
means positionable adjacent the work feed path for printing a pattern on the work piece;
means for precisely aligning said printing means with respect to said feeding means so that said printing means is adapted to bear against the work piece at a constant pressure, said aligning means comprising a support block; a pivot plate; means adapted for pivotally mounting said pivot plate to a frame of the apparatus; means for pivotally connecting said support block and pivot plate; and means for securing said print head element to said support block, said securing means comprising a rigid backing block, means for fastening said backing block to said support block, means for fastening said backing block to said print head element, and means on said blocking block for prestressing said print head element so that said thermal print line is as flat as possible; and
means for controlling said feeding means and said printing means to print a predetermined design on the work piece.

62. Apparatus according to claim 61, wherein said means for fastening said blocking block to said support block comprises a hand-manipulable thumbscrew.

63. Apparatus according to claim 61, while said means for fastening said backing block to said print head element comprises a plurality of mounting screws.

64. Apparatus according to claim 61, wherein said prestressing means comprises at least one compressive-type jackscrew for urging said print head away from said backing block at selected points.

65. Apparatus according to claim 61, wherein said prestressing means comprises at least one tension-type jackscrew for urging said print head toward said backing block at selected points.

66. Apparatus according to claim 61, wherein said aligning means further comprises releasable means for biasing said pivot plate toward the work feed path.

67. Apparatus according to claim 66, wherein said controlling means comprises means for monitoring the position of said releasable biasing means, and means for discontinuing operation of the apparatus if said releasable biasing means is not in its biasing position.

68. Apparatus according to claim 66, wherein said releasable biasing means comprises a plunger rod, means for releasably positioning said plunger rod proximate said pivot plate, and means for biasing said plunger rod against said pivot plate when said plunger rod is positioned proximate said pivot plate.

69. Apparatus according to claim 68, wherein said releasable positioning means comprises a toggle linkage connecting said plunger rod to said frame means, and handle means for selectively positioning said toggle linkage between a first released position and a second engaging position.

70. Apparatus according to claim 68, wherein said biasing means comprises a compression-type spring interposed between said plunger and said frame means.

71. An apparatus for precisely aligning a printing head with respect to a work feed path in a machine for printing a design on a hard plastic work piece, comprising:
   a support block;
   a pivot plate;
   means for pivotally mounting said pivot plate to a frame of the machine;
   means for pivotally connecting said support block to said pivot plate;
   means adapted for securing a printing head to said support block said securing means comprising means for fastening said backing block to said support block, means for fastening said backing block to the print head element and means on said backing block for pre-stressing said print head element so that said print head element is as flat as possible; whereby the print head element is precisely aligned.

72. An apparatus according to claim 71, wherein said means for fastening said backing block to said support block comprises a hand-manipulatable thumb screw.

73. An apparatus according to claim 71, wherein said means for fastening said backing block to said print head element comprises a plurality of mounting screws.

74. An apparatus according to claim 71, wherein said pre-stressing means comprises at least one compressive type jack screw for urging said print head away from said backing block at selected points.

75. An apparatus according to claim 71, wherein said pre-stressing means comprises at least on tension-type jack screw for urging said print head toward said backing block at selective points.

76. An apparatus according to claim 71, further comprising means for pivotally resiliently biasing said pivot plate away from the workfeed path.

77. An apparatus according to claim 71, further comprising releasable means for biasing said pivot plate toward the workfeed path.

78. An apparatus according to claim 77, wherein said releasable biasing means comprises plunger rod means for releasably positioning said plunger rod proximate said pivot plate, and means for biasing said plunger rod against said pivot plate when said plunger rod is positioned proximate said pivot plate.

79. An apparatus according to claim 78, wherein said releasable positioning means comprises to toggle linkage connecting said plunger rod to said frame means, and handle means for selectively positioning said toggle linkage between a first released position and a second engaged position.

80. An apparatus according to claim 78, wherein said biasing means comprises a compression type spring interposed between said plunger and the frame of the machine.

81. An apparatus according to claim 71, further comprising means for selectively urging the print head element away from the work feed path when said print head element is not in use, wherein wear on said print head element is reduced.

82. Apparatus according to claim 81, wherein said urging means comprising at least one retractor rod, a cam shaft having at least one cam surface for contacting said retractor rods and means for rotating said cam shaft in response to an external control signal.

83. An apparatus according to claim 82, wherein said cam shaft rotating means comprises a stepper motor.

* * * * *

UNITED STATES PATENT AND TRADEMARK OFFICE
CERTIFICATE OF CORRECTION

PATENT NO. : 5,037,216

DATED : August 6, 1991

INVENTOR(S) : Richard C. Nubson, et al.

It is certified that error appears in the above-identified patent and that said Letters Patent is hereby corrected as shown below:

In column 1, line 39, delete "for" after the word "example".

In column 9, line 1, insert --been-- after the word "has".

In column 10, line 60, delete "by" after the word "is".

In column 12, line 46, insert --other-- after the word "each".

In column 15, line 57, delete "the" after the word "to".

In column 16, line 23, delete "for" after the word "during".

In column 17, line 67, delete "18" and insert --514-- after the word "processor".

In column 18, line 1, delete "22" and insert --524-- after the word "thermistor".

In column 20, line 11, insert --of-- after the word "series".

In column 26, line 52, delete "while" and insert --wherein--.
   (Claim 63)

In column 25, line 59, delete "of" (2nd occur.) and insert --if--.
   (Claim 58)

In column 25, line 64, delete "roller" and insert --rollers--.
   (Claim 59)

UNITED STATES PATENT AND TRADEMARK OFFICE
CERTIFICATE OF CORRECTION

PATENT NO. : 5,037,216            Page 2 of 4

DATED : August 6, 1991

INVENTOR(S) : Richard C. Nubson, et al.

It is certified that error appears in the above-identified patent and that said Letters Patent is hereby corrected as shown below:

(f) removing particles that have been collected on the particle attracting elements whenever the total number of work pieces cleaned exceeds a predetermined number.

On page 2, under the heading "References Cited, U.S. PATENT DOCUMENTS", add the following:

| | | | |
|---|---|---|---|
| 2,919,129 | 12/1959 | Sjostrom | 271/33 |
| 3,382,130 | 05/1968 | Della Vite | 156/389 |
| 3,510,930 | 05/1970 | Stoever et al. | 15/256.5 |
| 3,857,560 | 12/1974 | Gundlach | 271/174 |
| 3,877,371 | 04/1975 | Jaffa | 101/425 |
| 4,271,476 | 06/1981 | Lotspiech | 364/515 |
| 4,272,202 | 06/1981 | Schroeder et al. | 400/208 |
| 4,464,669 | 08/1984 | Sekiya et al. | 346/76 PH |
| 4,545,069 | 10/1985 | Kermisch | 382/46 |
| 4,560,980 | 12/1985 | Tillich | 340/727 |
| 4,563,691 | 01/1986 | Noguchi et al. | 346/76 |
| 4,587,530 | 05/1986 | Noguchi | 346/76 PH |
| 4,590,487 | 05/1986 | Noguchi et al. | 346/76 PH |
| 4,590,488 | 05/1986 | Sullivan | 346/76 PH |
| 4,591,876 | 05/1986 | Nozaki et al. | 346/76 PH |
| 4,633,269 | 12/1986 | Mikami et al. | 346/76 PH |
| 4,636,810 | 01/1987 | Asakura et al. | 346/76 PH |
| 4,663,734 | 05/1987 | Berry | 364/900 |

UNITED STATES PATENT AND TRADEMARK OFFICE
CERTIFICATE OF CORRECTION

PATENT NO. : 5,037,216

DATED : August 6, 1991

INVENTOR(S) : Richard C. Nubson, et al.

It is certified that error appears in the above-identified patent and that said Letters Patent is hereby corrected as shown below:

In column 26, line 43, delete "blocking" and insert --backing--.
 (Claim 61)

In column 28, line 6, delete "on" and insert --one--.
 (Claim 75)

In column 23, line 44, delete "capstan" and insert --spool--.
 (Claim 33)

In column 23, line 51, delete "capstan" and insert --spool--.
 (Claim 34)

Add Claim 84 to read as follows:

84. A method according to claim 44, wherein the removing step comprises:

(a) detecting the presence of the work piece before the work piece reaches the cleaning station;

(b) feeding the work piece into the cleaning station;

(c) engaging the surfaces of the work piece to be cleaned with a corresponding number of adhesive particle attracting elements;

(d) removing the work piece from the cleaning station;

(e) determining the total number of work pieces that have been cleaned responsive to detecting step; and

UNITED STATES PATENT AND TRADEMARK OFFICE
CERTIFICATE OF CORRECTION

PATENT NO. : 5,037,216

DATED : August 6, 1991

INVENTOR(S) : Richard C. Nubson, et al.

It is certified that error appears in the above-identified patent and that said Letters Patent is hereby corrected as shown below:

On page 2, under the heading "References Cited, FOREIGN PATENT DOCUMENTS", add the following:

| | | | |
|---|---|---|---|
| 13193 | 02/1981 | Japan | 400/225E |
| 74181 | 05/1982 | Japan | - |
| 54872 | 03/1985 | Japan | - |
| 77978 | 04/1987 | Japan | 400/225 |

Signed and Sealed this

Twentieth Day of July, 1993

Attest:

MICHAEL K. KIRK

Attesting Officer     Acting Commissioner of Patents and Trademarks

UNITED STATES PATENT AND TRADEMARK OFFICE
CERTIFICATE OF CORRECTION

PATENT NO. : 5,037,216

DATED : August 6, 1991

INVENTOR(S) : Richard C. Nubson et al.

It is certified that error appears in the above-identified patent and that said Letters Patent is hereby corrected as shown below:

On page 2 of the cover page, under the heading "FOREIGN PATENT DOCUMENTS," Japanese Patent No. "61-79041" should read as --61-79688.

Signed and Sealed this

Twenty-third Day of November, 1993

Attest:

BRUCE LEHMAN

Attesting Officer

Commissioner of Patents and Trademarks